US011372321B2

United States Patent
Aizaki et al.

(10) Patent No.: US 11,372,321 B2
(45) Date of Patent: Jun. 28, 2022

(54) PROJECTOR AND MULTI-PROJECTION SYSTEM

(71) Applicant: JVCKENWOOD Corporation, Yokohama (JP)

(72) Inventors: Takatsugu Aizaki, Yokohama (JP); Shinji Kikuma, Yokohama (JP); Yasuki Arihara, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/951,336

(22) Filed: Nov. 18, 2020

(65) Prior Publication Data

US 2021/0072629 A1 Mar. 11, 2021

Related U.S. Application Data

(63) Continuation of application No. PCT/JP2019/001059, filed on Jan. 16, 2019.

(30) Foreign Application Priority Data

May 22, 2018 (JP) .............................. JP2018-097923
May 22, 2018 (JP) .............................. JP2018-097930

(51) Int. Cl.
*G03B 21/20* (2006.01)
*G02B 27/14* (2006.01)
(Continued)

(52) U.S. Cl.
CPC ....... *G03B 21/2073* (2013.01); *G02B 27/141* (2013.01); *G02B 27/283* (2013.01);
(Continued)

(58) Field of Classification Search
CPC .... G03B 21/13; G03B 21/145; G03B 21/204; G03B 21/208; G03B 21/2013;
(Continued)

(56) References Cited

U.S. PATENT DOCUMENTS 8,152,309 B2 * 4/2012 Hasegawa ................. G09F 9/35
353/38
2012/0242912 A1 * 9/2012 Kitano ....................... F21V 9/08
362/19

(Continued)

FOREIGN PATENT DOCUMENTS

| JP | H3-53288 A | 3/1991 |
| JP | 2004-205919 A | 7/2004 |

(Continued)

OTHER PUBLICATIONS

Search Report dated Apr. 1, 2021 issued in corresponding European Application No. 19807003.9.

*Primary Examiner* — Sultan Chowdhury
(74) *Attorney, Agent, or Firm* — Nath, Goldberg & Meyer; Jerald L. Meyer

(57) ABSTRACT

A first illumination light source emits a first illumination light ray which is a first polarized light. Either one of an s-polarized light and a p-polarized light, which are linearly polarized light, is the first polarized light and the other is a second polarized light. A second illumination light source emits a second illumination light ray. A dichroic mirror includes a specific polarization reflection area and a transmission area. The specific polarization reflection area reflects the first polarized light and transmits the second polarized light and the second illumination light ray. The transmission area transmits the first and second illumination light rays. A phase difference plate converts linearly polarized light into circularly polarized light. A polarization conversion element transmits either the first or second (Continued)

polarized light, shifts an optical axis of the other, and aligns the first and second illumination light rays to the first or second polarized light.

8 Claims, 24 Drawing Sheets

(51) Int. Cl.
  *G02B 27/28* (2006.01)
  *G03B 33/12* (2006.01)
(52) U.S. Cl.
  CPC ....... *G03B 21/204* (2013.01); *G03B 21/2013* (2013.01); *G03B 33/12* (2013.01)
(58) Field of Classification Search
  CPC ............ G03B 21/2033; G03B 21/2053; G03B 21/2066; G03B 21/2073; G03B 33/06; G03B 33/12; H04N 9/315; H04N 9/3147; H04N 9/3158; H04N 9/3161; H04N 9/3164; H04N 9/3167
  See application file for complete search history.

(56) References Cited

U.S. PATENT DOCUMENTS

| | | |
|---|---|---|
| 2013/0063701 A1 | 3/2013 | Ouderkirk et al. |
| 2013/0229628 A1* | 9/2013 | Akiyama ........... G03B 21/2073 353/20 |
| 2017/0195645 A1* | 7/2017 | Sakata ................. G02B 5/3083 |
| 2017/0205696 A1 | 7/2017 | Kikuma et al. |
| 2017/0205699 A1* | 7/2017 | Okubo ................. G03B 21/204 |
| 2018/0217486 A1* | 8/2018 | Tanaka ................. G03B 21/204 |
| 2018/0241978 A1* | 8/2018 | Hirota ...................... H04N 5/74 |
| 2020/0103734 A1* | 4/2020 | Sugiyama ............... G03B 33/12 |

FOREIGN PATENT DOCUMENTS

| | | |
|---|---|---|
| JP | 2009-159372 A | 7/2009 |
| JP | 2012-4009 A | 1/2012 |
| JP | 2012-123180 A | 6/2012 |
| JP | 2016-31514 A | 3/2016 |
| JP | 2017-152785 A | 8/2017 |
| JP | 2018-013764 A | 1/2018 |
| WO | 2015/111145 A1 | 7/2015 |

* cited by examiner

• : s-POLARIZED LIGHT
↕ : p-POLARIZED LIGHT

● : s-POLARIZED LIGHT     ↔ : p-POLARIZED LIGHT

● : s-POLARIZED LIGHT     ↔ : p-POLARIZED LIGHT

PROJECTOR AND MULTI-PROJECTION SYSTEM

CROSS REFERENCE TO RELATED APPLICATION

This application is a Continuation of PCT Application No. PCT/JP2019/001059, filed on Jan. 16, 2019, and claims the priority of Japanese Patent Application No. 2018-097923, filed on May 22, 2018 and Japanese Patent Application No. 2018-097930, filed on May 22, 2018, the entire contents of all of which are incorporated herein by reference.

BACKGROUND

The present disclosure relates to a projector and a multi-projection system.

A multi-projection system includes a plurality of projectors. The multi-projection system displays a multi-projection image on a screen or the like by projecting a plurality of images side by side on a screen or the like by a plurality of projectors.

In the multi-projection system, each projected image is subjected to an edge blending process in order to make a boundary between the projected images inconspicuous. The edge blending process is a process of adjusting the brightness of the projected image so that the overlapping area of the projected images does not become extremely bright when the adjacent images are projected by overlapping predetermined areas.

Japanese Unexamined Patent Application Publication No. 2009-159372 (Patent Literature 1) describes an edge blending process for adjusting the brightness of a projected image so that the region of the projected image corresponding to the overlapping region of the projected images is continuously darkened toward the edge.

An electrical edge blending process as described in Patent Literature 1 is effective for a bright projected image, but cannot secure a sufficient dynamic range for adjusting the brightness for a dark projected image. Therefore, in the electrical edge blending process, the overlapping region of the projected images becomes bright for a dark projected image, which causes deterioration of the quality of the multi-projected image.

Japanese Unexamined Patent Application Publication 3-53288 (Patent Literature 2) describes an edge blending process in which a light shielding plate is arranged between a projector and a screen, an edge of a projected image is shaded by being blocked by the light shielding plate, and the brightness of the projected image is adjusted so that the region of the projected image corresponding to the overlapping region of the projected images becomes continuously dark toward the edge.

In the optical edge blending process as described in Patent Literature 2, the brightness of the projected image region corresponding to the overlapping region of the projected images can be adjusted regardless of the brightness of the projected images.

SUMMARY

A projector may include a plurality of illumination light sources. For example, a projector uses a blue laser light source and a phosphor as a plurality of illumination light sources. The blue laser light source emits blue laser light rays as blue illumination light rays. The phosphor converts the energy of the blue laser light rays emitted from the blue laser light source into yellow illumination light rays in a wavelength band including a red band and a green band. The projector separates the yellow illumination light rays into red illumination light rays and green illumination light rays.

The projector photomodulates the red illumination light rays, the green illumination light rays, and the blue illumination light rays based on the image data of each color component to generate red image light rays, green image light rays, and blue image light rays. The projector synthesizes the red image light rays, the green image light rays, and the blue image light rays, and projects them on a screen or the like. That is, the blue image light rays corresponding to the blue image projected on the screen or the like is generated by using the blue laser light source as the illumination light source. The red image light rays and green image light rays corresponding to the red image and green image are generated using the phosphor as the illumination light source.

The orientation distribution of the projected image is different between the blue image light rays with the blue laser light source as the illumination light source and the red image light rays and green image light rays with the phosphor as the illumination light source. In the optical edge blending process using a light shielding plate, a color distribution is generated in the projected image region corresponding to the overlapping region of the projected images due to the difference in the orientation distribution, which causes deterioration of the quality of the multi-projected image.

A first aspect of one or more embodiments provides a projector including: a first illumination light source configured to emit a first illumination light ray which is a first polarized light when either one of an s-polarized light and a p-polarized light, which are linearly polarized light, is set as the first polarized light and the other is set as a second polarized light; a second illumination light source configured to emit a second illumination light ray; a first dichroic mirror, which is arranged on an optical path of the first and second illumination light rays, comprising a specific polarization reflection area which reflects the first polarized light and transmits the second polarized light and the second illumination light ray, and a transmission area which transmits the first and second illumination light rays; a phase difference plate, which is arranged on an optical path of the first and second illumination light rays which pass through the first dichroic mirror, configured to convert the linearly polarized light into circularly polarized light; and polarization conversion element, which is arranged on an optical path of the first and second illumination light rays transmitted through the phase difference plate, configured to transmit a polarized light of either the first polarized light or the second polarized light, to shift an optical axis of the other polarized light, and to align the first and second illumination light rays to the first polarized light or the second polarized light.

A second aspect of one or more embodiments provides a projector including: a first illumination light source configured to emit a first illumination light ray which is a second polarized light when either one of an s-polarized light and a p-polarized light, which are linearly polarized light, is set as a first polarized light and the other is set as the second polarized light; a second illumination light source configured to emit a second illumination light ray; a first dichroic mirror, which is arranged on an optical path of the first and second illumination light rays, comprising a specific polarization reflection area which transmits the second polarized light and reflects the first polarized light and the second illumination light ray, and a total reflection area which reflects the first and second illumination light rays; a phase difference plate, which is arranged on an optical path of the first and second illumination light rays which are reflected by the first dichroic mirror, configured to convert the linearly polarized light into circularly polarized light; and a polarization conversion element, which is arranged on an optical path of the first and second illumination light rays transmitted through the phase difference plate, configured to transmit a polarized light of either the first polarized light or the second polarized light, to shift an optical axis of the other polarized light, and to align the first and second illumination light rays to the first polarized light or the second polarized light.

A third aspect of one or more embodiments provides a multi-projection system including: a plurality of the above-described projectors, which project images; and a plurality of light shielding plates which are arranged corresponding to each of the projectors so as to block parts of the images, wherein a plurality of images projected by the plurality of projectors are displayed as a multi-projection image by overlapping the parts with each other.

DETAILED DESCRIPTION

Figure 1:
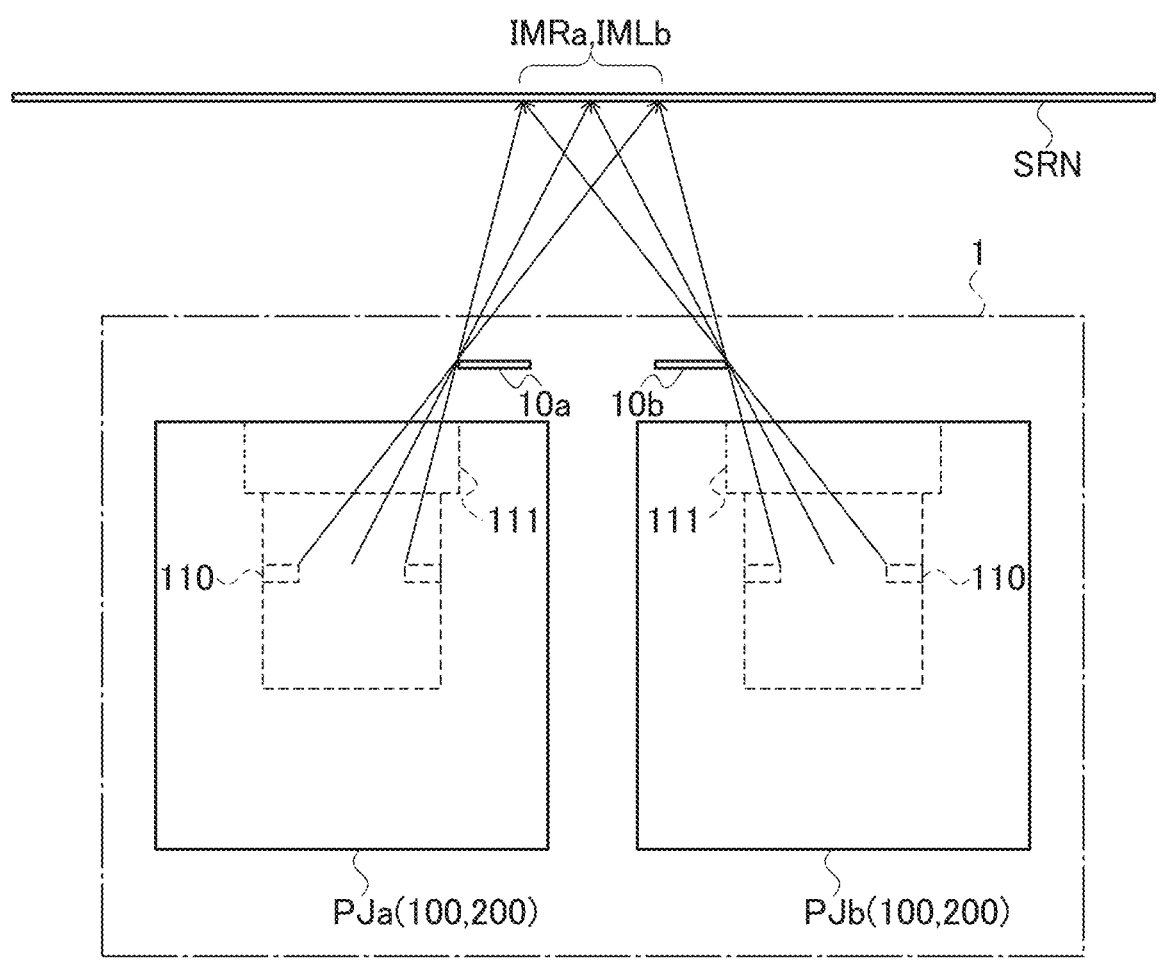
FIG. 1 is a configuration diagram illustrating an example of a multi-projection system according to first and second embodiments.

A configuration example of a multi-projection system will be described with reference to FIGS. 1, 2A, and 2B. As illustrated in FIG. 1, a multi-projection system 1 includes a plurality of projectors PJ and a plurality of light shielding plates 10. The projector PC projects an image IM on a screen SRN. FIG. 1 illustrates a state in which two projectors PJ are arranged horizontally. In order to distinguish the two projectors PJ, the left projector PJ is referred to as a projector PJa and the right projector PJ is referred to as a projector PJb.

The light shielding plate 10 is arranged between the projector PJ and the screen SRN. The light shielding plate 10 is arranged for each projector PJ. The light shielding plate 10 corresponding to the projector PJa is referred to as a light shielding plate 10a and the light shielding plate 10 corresponding to the projector PJb is referred to as a light shielding plate 10b.

Figure 2A:
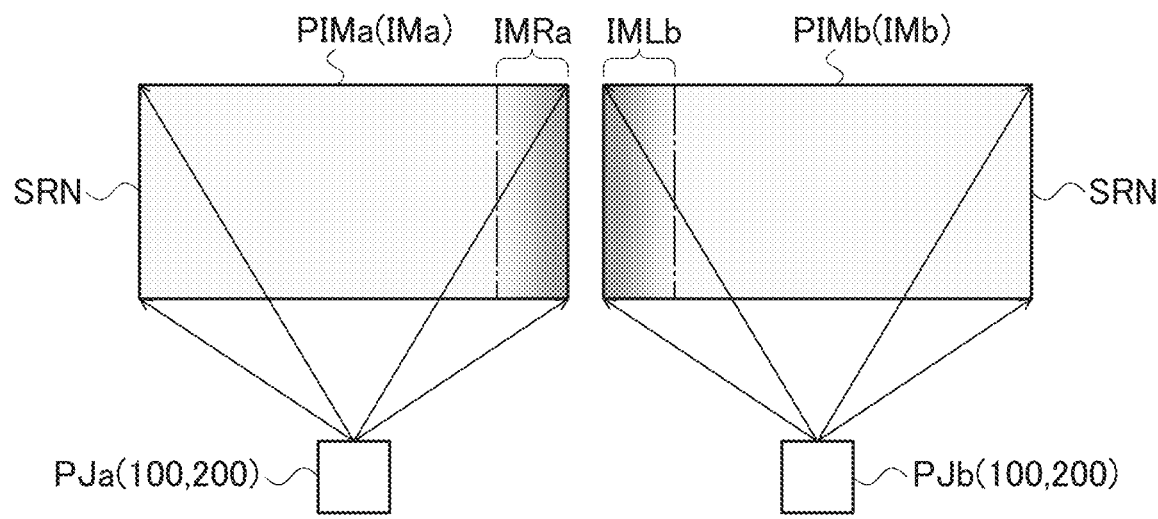
FIG. 2A is a diagram illustrating brightness of a projection image displayed on a screen.
Figure 2B:
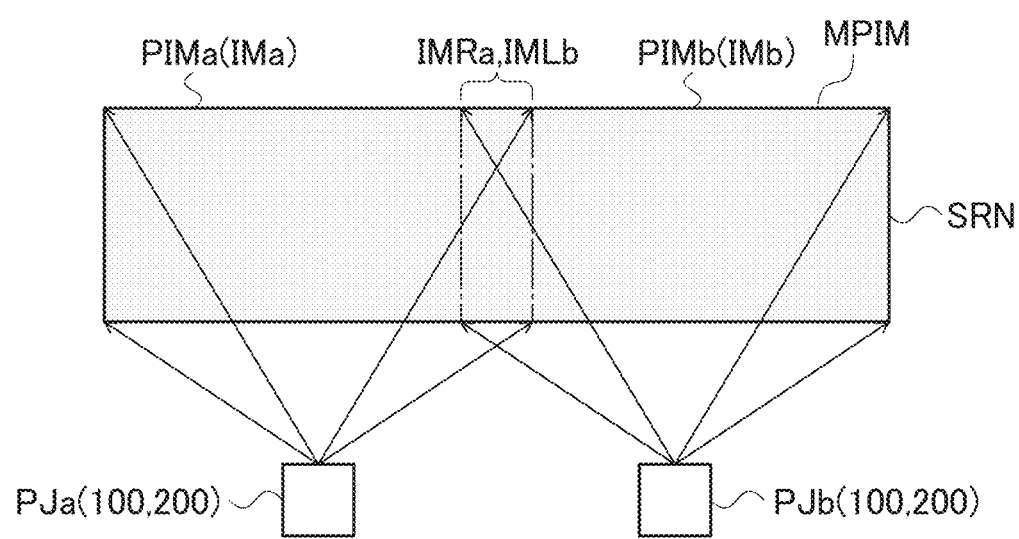
FIG. 2B is a diagram illustrating brightness of a multi-projection image displayed on the screen.

In FIGS. 2A and 2B, the brightness of the projection image displayed on the screen SRN is shown in shades. In FIGS. 2A and 2B, only the projectors PJa and PJb and the screen SRN are shown in order to make the projection image easy to see.

As illustrated in FIG. 2A, the projector PJa projects an image IMa on the screen SRN. As illustrated in FIG. 1, the light shielding plate 10a is arranged corresponding to the projector PJa so as to light-block a part of the image IMa. Specifically, the light shielding plate 10a is arranged such that the right side region of the image IMa is blocked by the light shielding plate 10a. Therefore, the projector PJa projects the shadow of the light shielding plate 10a on the screen SRN as a part of the image IMa.

In the image IMa projected on the screen SRN, the region blocked by the light shielding plate 10a corresponds to the shadow region of the light shielding plate 10a. In the right side region of the image IMa, the degree of light shielding by the light shielding plate 10a increases toward the right end. Therefore, in the image IMa projected on the screen SRN, the degree of shadow of the light shielding plate 10a increases toward the right end. For that reason, in the image IMa projected on the screen SRN, the right region IMRa continuously darkens toward the right end. The image IMa projected on the screen SRN is referred to as a projection image PIMa.

As illustrated in FIG. 2A, the projector PJb projects an image IMb on the screen SRN. As illustrated in FIG. 1, the light shielding plate 10b is arranged corresponding to the projector PJb so as to light-block a part of the image IMb. Specifically, the light shielding plate 10b is arranged such that the left side region of the image IMb is blocked by the light shielding plate 10b. Therefore, the projector PJb projects the shadow of the light shielding plane 10b on the screen SRN as a part of the image IMb.

In the image IMb projected on the screen SRN, the region blocked by the light shielding plate 10b corresponds to the shadow region of the light shielding plate 10b. In the left side region of the image IMb, the degree of light shielding by the light shielding plate 10b increases toward the left end. Therefore, in the image IMb projected on the screen SRN, the degree of shadow of the light shielding plate 10b increases toward the left end. For that reason, in the image IMb projected on the screen SRN, the left region IMLb continuously darkens toward the left end. The image IMb projected on the screen SRN is referred to as a projection image PIMb.

As illustrated in FIG. 1 or 2B, the projector PJa and the projector PJb project the image IMa and the image IMb on the screen SRN so that the right region IMRa of the projection image PIMa and the left region IMLb of the projection image PIMb overlap each other.

That is, the multi-projection system 1 displays the images IMa and IMb projected by the plurality of projectors PJa and PJb on the screen SRN as a multi-projection image MPIM so that a part of the regions light-shielded by the light shielding plate 10 in the plurality of projection images PIM, specifically, the region IMRa blocked by the light shielding plate 10a in the projection image PIMa and the region IMLb blocked by the light shielding plate 10b in the projection image PIMb, overlap each other.

Therefore, the multi-projection system 1 can display, on the screen SRN, the multi-projection image MPIM which has been optically edge blended by the light shielding plates 10a and 10b so that the brightness of the overlapping area between the projection image PIMa and the projection image PIMb is the same as the brightness of other areas.

First Embodiment

A configuration example of the projector PJ will be described with reference to FIG. 3. A projector 100 according to a first embodiment illustrated in FIG. 3 corresponds to the projector PJ (PJa and PJb) illustrated in FIGS. 1, 2A and 2B. The projector 100 includes a light source 101, a phosphor 102, dichroic mirrors 120, lenses 131 to 137, reflection mirrors 141 to 143, a phase difference plate 103, and a polarization conversion element 150. In a first embodiment, the phase difference plate 103 is defined as a first phase difference plate.

Further, the projector 100 includes dichroic mirrors 105 and 106, reflective polarizing plates 107R, 107G, and 107B, image display elements 108R, 108G, and 108B, a color combining prism 109, an aperture 110, and a projection lens 111. In a first embodiment, the dichroic mirror 120 is defined as a first dichroic mirror, the dichroic mirror 105 is defined as a second dichroic mirror, and the dichroic mirror 106 is defined as a third dichroic mirror.

The light source 101 is a blue laser light source having an array structure in which a plurality of blue laser elements BL are arranged. The light source 101 emits blue laser light rays from each of the plurality of blue laser elements BL. The blue laser light rays are s-polarized or p-polarized linearly polarized light. FIG. 3 illustrates a case where the blue laser light rays are s-polarized linearly polarized light. The blue laser light rays are irradiated onto the dichroic mirrors 120. In a first embodiment, the light source 101 is defined as a first illumination light source and the blue laser light ray is defined as a first illumination light ray. In addition, the s-polarized light is defined as a first polarized light and the p-polarized light is defined as a second polarized light.

The dichroic mirrors 120 are arranged such that a polarization direction of the blue laser light ray is s-polarized with respect to the dichroic mirror 120. The dichroic mirror 120 has an optical property of reflecting s-polarized light and transmitting p-polarized light with respect to blue laser light rays. The lens 131 is a condenser lens, for example. The blue laser light rays emitted from the light source 101 are reflected by the dichroic mirrors 120, further condensed by the lens 131, and irradiated onto the phosphor 102.

The phosphor 102 has a fluorescent layer and a reflective surface. The fluorescent layer generates yellow illumination light rays including a red band component and a green band component having an intensity corresponding to the energy intensity of the light emitted from the light source 101, specifically, corresponding to the energy intensity of the blue laser light rays emitted from the light source 101. The reflective surface reflects the blue laser light rays transmitted through the fluorescent layer and the yellow illumination light rays generated by the fluorescent layer.

In a first embodiment, the phosphor 102 is defined as second illumination light source and the yellow illumination light ray is defined as a second illumination light ray. Therefore, the projector 100 includes the light source 101 (blue laser element BL) which is the first illumination light source and the phosphor 102 which is the second illumination light source as a plurality of illumination light sources.

The yellow illumination light rays which are the fluorescence rays generated by the phosphor 102 are irradiated onto the dichroic mirrors 120 via the lens 131. A part of the blue laser light rays is diffused by the phosphor 102 and becomes a random polarized light in which a plurality of polarized light are mixed, and then is irradiated onto the dichroic mirrors 120 via the lens 131. That is, the dichroic mirrors 120 are arranged on the optical path of the blue laser light rays and the yellow illumination light rays. The dichroic mirror 120 has an optical property of transmitting yellow illumination light rays.

Figure 3:
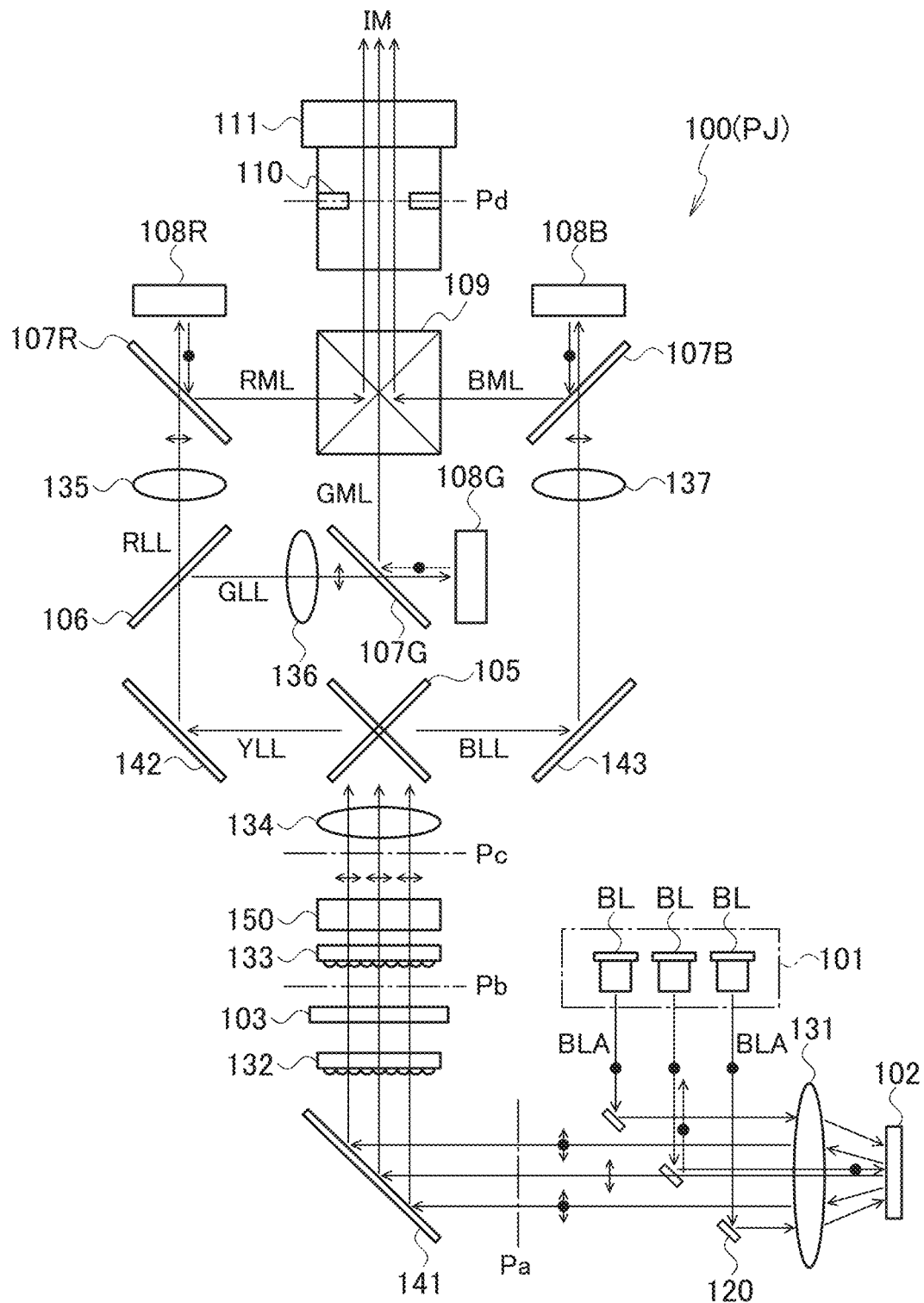
FIG. 3 is a configuration diagram illustrating an example of the projector according to a first embodiment.
Figure 4A:
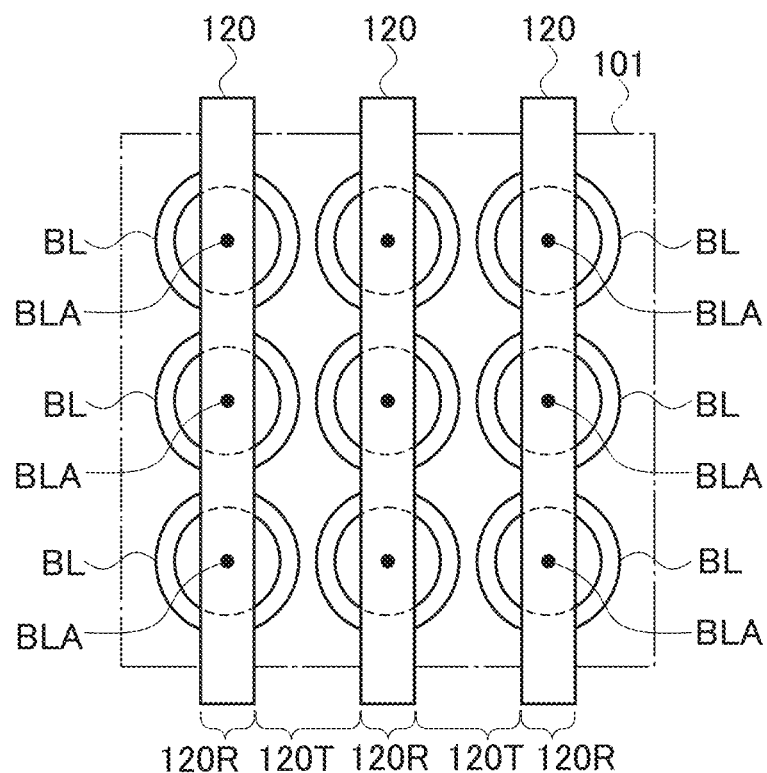
FIG. 4A is a configuration diagram illustrating an example of a dichroic mirror in the projector of a first embodiment.

FIG. 4A illustrates a configuration example of the dichroic mirrors 120. FIG. 4A illustrates a state in which the dichroic mirrors 120 are viewed from the side opposite to the light source 101, that is, a state in which the dichroic mirrors 120 are viewed from the lower side in FIG. 3. The dichroic mirrors 120 have specific polarization reflection areas 120R and transmission areas 120T.

The specific polarization reflection area 120R reflects the s-polarized light in the blue laser light rays and transmits the p-polarized light in the blue laser light rays and the yellow illumination light rays. The transmission area 120T transmits all polarized light including the s-polarized light and the p-polarized light in the blue laser light rays and the yellow illumination light rays.

The specific polarization reflection area 120R is arranged on an optical axis BLA of the blue laser element BL. The specific polarization reflection area 120R is formed so as to have an area larger than the luminous flux width of the blue laser light ray. Therefore, all the blue laser light rays emitted from the plurality of blue laser elements BL are reflected toward the lens 131 by the dichroic mirrors 120. Further, the blue laser light rays are condensed by the lens 131 and are irradiated onto the phosphor 102.

The specific polarization reflection area 120R is formed so as to have an area smaller than the luminous flux width of the diffused light rays emitted from the phosphor 102 through the lens 131. Of the blue laser light rays emitted from the phosphor 102 to the specific polarization reflection areas 120R, the p-polarized light component is transmitted through the specific polarization reflection areas 120R and the s-polarized light component is reflected by the specific polarization reflection areas 120R and returned to the light source 101. The blue laser light rays emitted from the phosphor 102 to the transmission areas 120T passes through the transmission areas 120T. The blue laser light rays transmitted through the dichroic mirrors 120 are defined as blue illumination light rays.

Figure 4B:
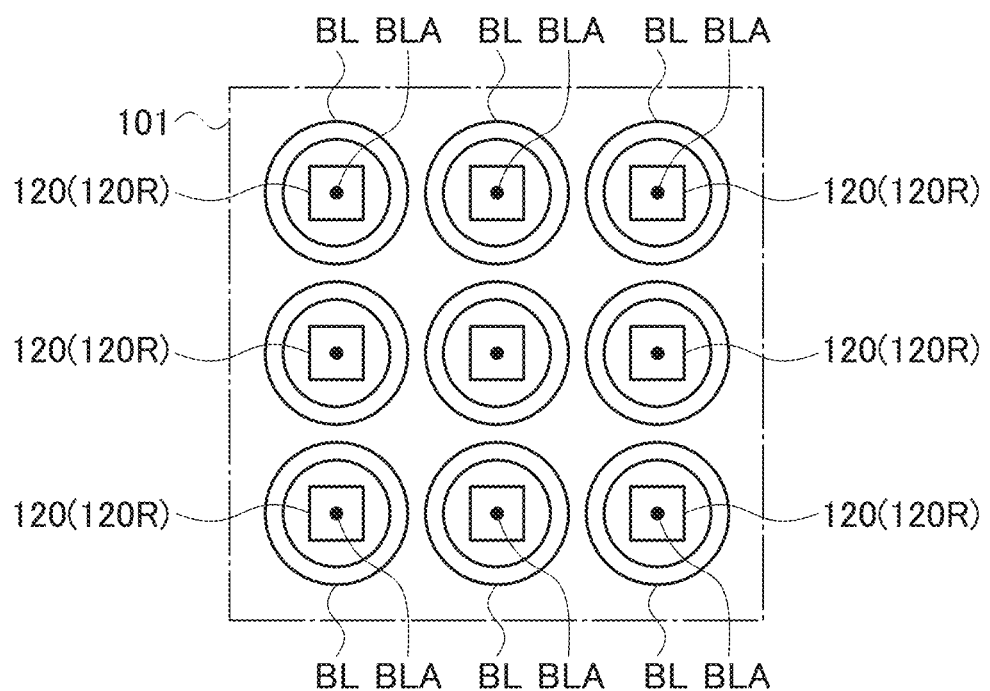
FIG. 4B is a configuration diagram illustrating another example of the dichroic mirror in the projector of a first embodiment.

The yellow illumination light rays emitted from the phosphor 102 and irradiated onto the dichroic mirrors 120 via the lens 131 pass through the specific polarization reflection areas 120R and the transmission areas 120T. As illustrated in FIG. 4B, the dichroic mirrors 120 may be configured such that the specific polarization reflection areas 120R are arranged on the optical axes BLA of the blue laser elements BL and the areas other than the specific polarization reflection areas 120R are defined as the transmission areas 120T.

The dichroic mirror 120 can be manufactured by forming a dielectric multilayer film, for example, on a predetermined region of a transparent material such as a glass plate or a prism. The region where the dielectric multilayer film is formed becomes the specific polarization reflection area 120R. The optical properties of the specific polarization reflection area 120R can be set according to the material and film thickness of the dielectric material forming the dielectric multilayer film.

The distribution of the brightness of the blue illumination light rays, and the red illumination light rays and the green illumination light rays included in the yellow illumination light rays at a position Pa where the blue illumination light rays and the yellow illumination light rays transmit have passed through the dichroic mirrors 120 will be described with reference to FIGS. 5A, 5B, 6A, 6B, 7A, 7B, 8A, and 8B. Note that FIGS. 5A, 5B, 6A, 6B, 7A, 7B, 8A, and 8B illustrate a case where the dichroic mirror 120 has the shape illustrated in FIG. 4A.

Figure 5A:
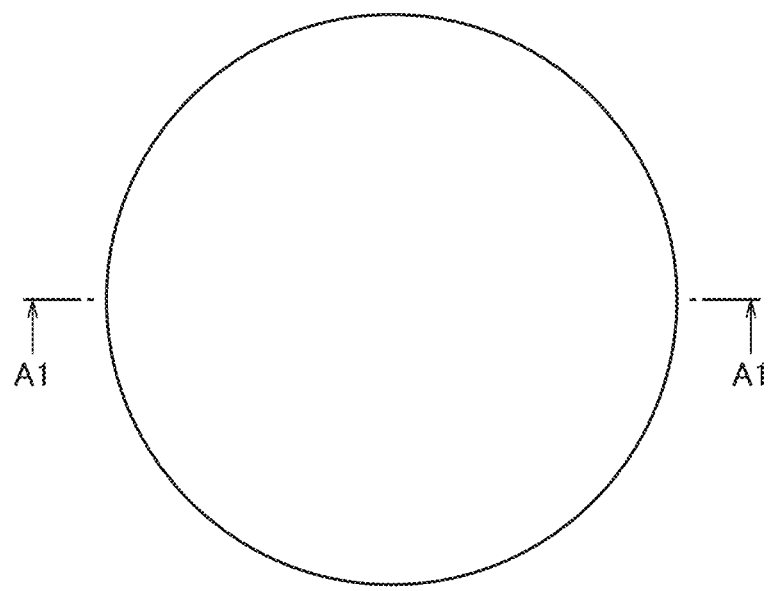
FIG. 5A is a diagram illustrating brightness distributions of red illumination light rays and green illumination light rays.
Figure 5B:
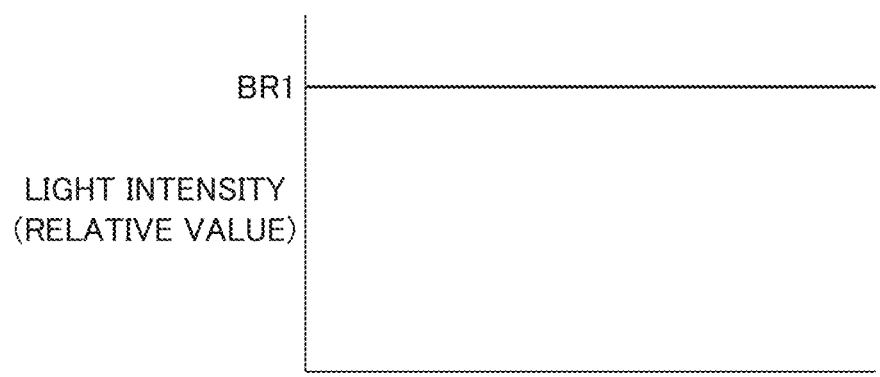
FIG. 5B is a diagram illustrating distributions of light intensities of red illumination light rays and green illumination light rays in A1-A1 illustrated in FIG. 5A.

FIG. 5A illustrates the brightness distributions of the red illumination light rays and the green illumination light rays included in the yellow illumination light rays at the position Pa in shades. FIG. 5B illustrates the brightness distribution of the red illumination light rays and the green illumination light rays in A1-A1 illustrated in FIG. 5A as a light intensity distribution. The red illumination light rays are composed of the components in the red band included in the yellow illumination light rays, and the green illumination light rays are composed of the components in the green band included in the yellow illumination light rays.

The yellow illumination light rays pass through the specific polarization reflection areas 120R and the transmission areas 120T of the dichroic mirrors 120. Therefore, at the position Pa, as illustrated in FIG. 5A or 5B, the brightness (light intensity) distribution of the red illumination light rays and the green illumination light rays is uniform. The light intensity of the red illumination light rays and the green illumination light rays at the position Pa is set as a BR1.

Figure 6A:
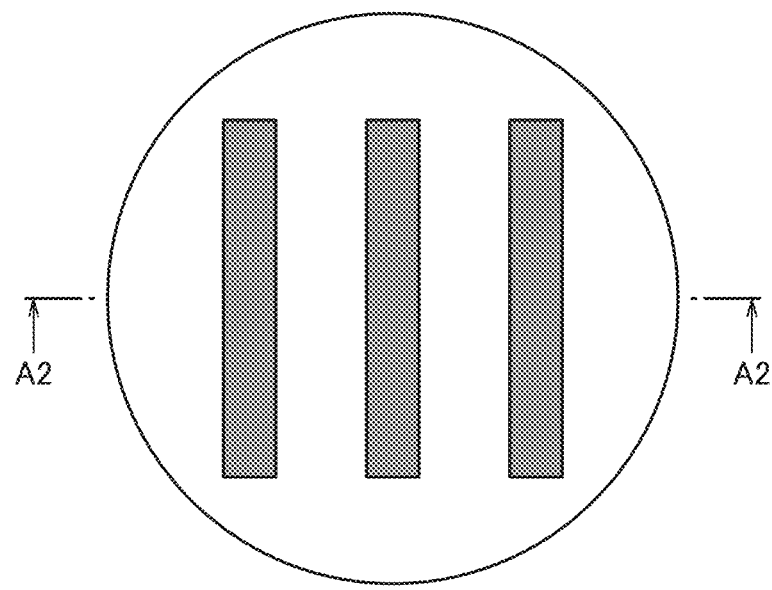
FIG. 6A is a diagram illustrating a brightness distribution of blue illumination light rays.
Figure 6B:
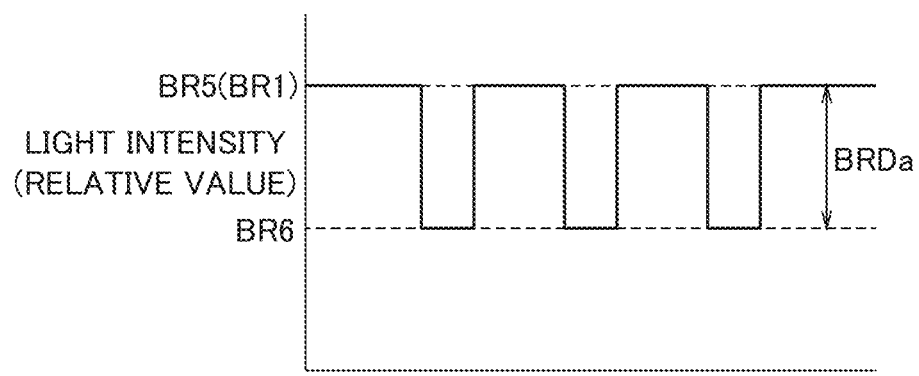
FIG. 6B is a diagram illustrating a distribution of a light intensity of blue illumination light rays in A2-A2 in FIG. 6A.
Figure 7A:
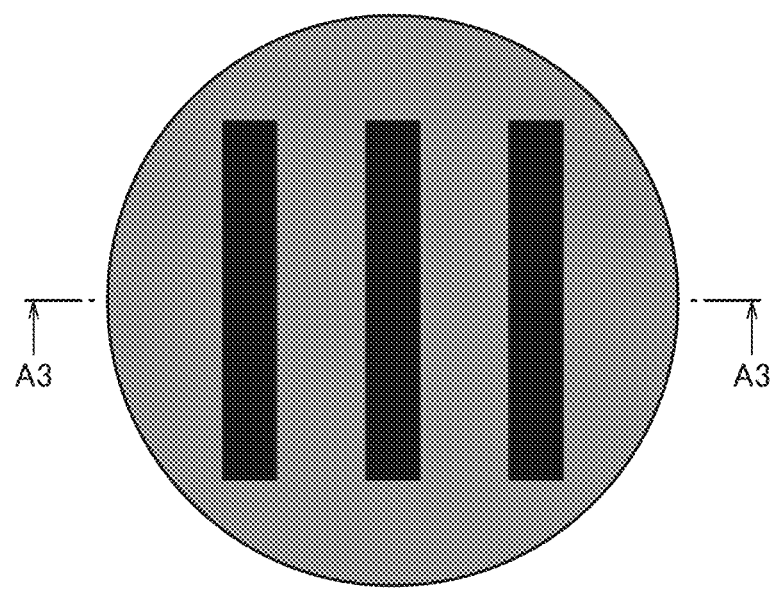
FIG. 7A is a diagram illustrating a brightness distribution of s-polarized light in blue illumination light rays.
Figure 7B:
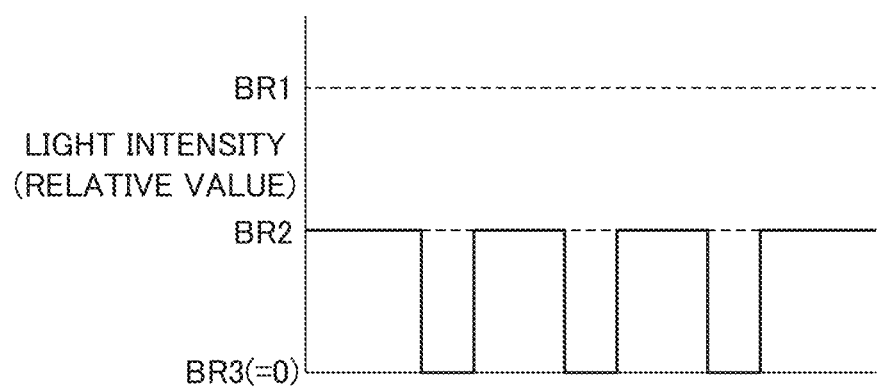
FIG. 7B is a diagram illustrating distribution of a light intensity of s-polarized light in the blue illumination light rays in A3-A3 illustrated in FIG. 7A.
Figure 8A:
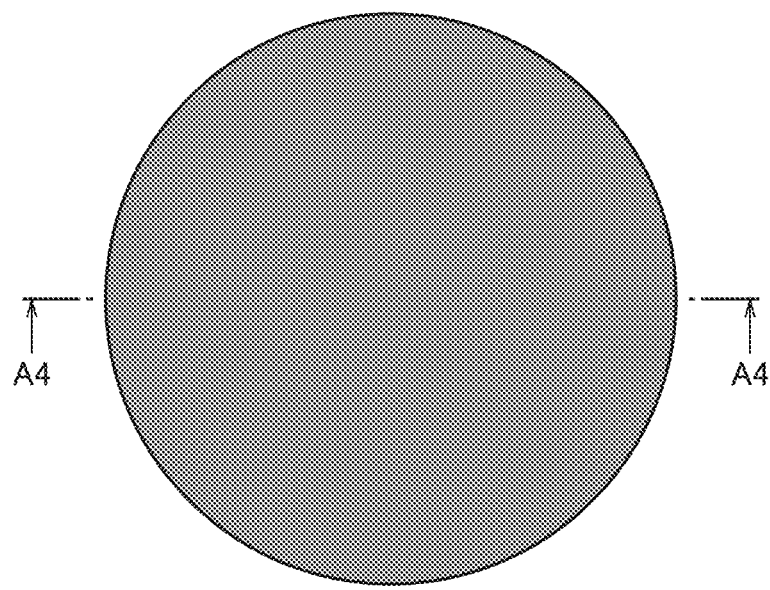
FIG. 8A is a diagram illustrating a brightness distribution of p-polarized light in blue illumination light rays.
Figure 8B:
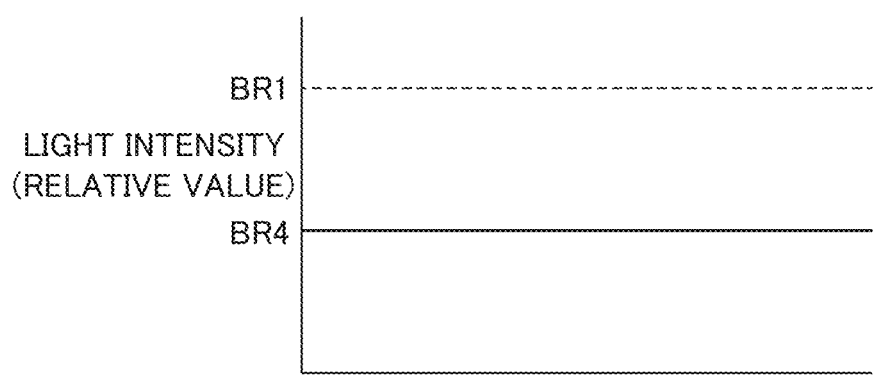
FIG. 8B is a diagram illustrating a distribution of a light intensity of p-polarized light in the blue illumination light rays in A4-A4 illustrated in FIG. 8A.

FIG. 6A corresponds to FIG. 5A and illustrates the brightness distribution of the blue illumination light rays in shades. FIG. 6B illustrates the brightness distribution of the blue illumination light rays in A2-A2 illustrated in FIG. 6A as the light intensity distribution. FIG. 7A corresponds to FIG. 6A and illustrates the brightness distribution of the s-polarized light in the blue illumination light rays in shades. FIG. 7B illustrates the brightness distribution of the s-polarized light in the blue illumination light rays in A3-A3 illustrated in FIG. 7A as a light intensity distribution. FIG. 8A corresponds to FIG. 6A and illustrates the brightness distribution of the p-polarized light in the blue illumination light rays in shades. FIG. 8B illustrates the brightness distribution of the p-polarized light in the blue illumination light rays in A4-A4 illustrated in FIG. 8A as a light intensity distribution.

The s-polarized light in the blue illumination light rays pass through the transmission areas 120T of the dichroic mirrors 120 and are reflected at the specific polarization reflection areas 120R. Therefore, the s-polarized light in the blue illumination light rays are eventually blocked by the specific polarization reflection areas 120R. Therefore, at the position Pa, as illustrated in FIG. 7A, the s-polarized light in the blue illumination light rays have a brightness (light intensity) distribution in which the region corresponding to the specific polarization reflection areas 120R is light-blocked and the region corresponding to the transmission areas 120T is darker than the red illumination light rays and the green illumination light rays.

That is, in the s-polarized light in the blue illumination light rays, as illustrated in FIG. 7B, the region corresponding to the transmission areas 120T has a light intensity BR2 (BR2<BR1) smaller than the light intensity BR1 of the red illumination light rays and the green illumination light rays, and the region corresponding to the specific polarization reflection areas 120R has a light intensity BR3 (BR2>BR3=0) smaller than the light intensity BR2 of the region corresponding to the transmission areas 120T.

The p-polarized light in the blue illumination light rays pass through the specific polarization reflection areas 120R and the transmission areas 120T of the dichroic mirrors 120. Therefore, at the position Pa, as illustrated in FIG. 8A, the p-polarized light in the blue illumination light rays are darker than the red illumination light rays and the green illumination light rays and the brightness (light intensity) distribution is uniform. That is, the p-polarized light in the blue illumination light rays have a light intensity BR4 (BR4<BR1) smaller than the light intensity BR1 of the red illumination light rays and the green illumination light rays at the position Pa, as illustrated in FIG. 8B.

Accordingly, as illustrated in FIG. 6A, the blue illumination light rays including the s-polarized light having the brightness (light intensity) distribution illustrated in FIGS. 7A and 7B and the p-polarized light having the brightness (light intensity) distribution illustrated in FIGS. 8A and 8B have a brightness (light intensity) distribution in which the region corresponding to the transmission areas 120T has the same brightness as the red illumination light rays and the green illumination light rays, and the region corresponding to the specific polarization reflection areas 120R is darker than the red illumination light rays and the green illumination light rays.

That is, in the blue illumination light rays, as illustrated in FIG. 6B, the region corresponding to the transmission areas 120T has the same light intensity BR5 (BR5=BR1) as the light intensity BR1 of the red illumination light rays and the green illumination light rays, and the region corresponding to the specific polarization reflection areas 120R has a light intensity BR6 (BR6<BR5) smaller than the light intensity BR5 of the region corresponding to the transmission areas 120T. The difference between the light intensity BR5 and the light intensity BR6 of the blue illumination light rays at the position Pa is defined as a light intensity difference BRDa.

The lenses 132 and 133 illustrated in FIG. 3 are fly-eye lenses, for example. As illustrated in FIG. 3, the blue illumination light rays and the yellow illumination light rays transmitted through the dichroic mirrors 120 are reflected by the reflection mirrors 141. Further, in the blue illumination light rays and the yellow illumination light rays, the illumination distributions of the red illumination light rays, the green illumination light rays, and the blue illumination light rays irradiated onto the image display elements 108R, 108G, and 108B are made uniform by the lenses 132 and 133.

The phase difference plate 103 is arranged between the dichroic mirrors 120 and the polarization conversion element 150 on the optical path of the blue illumination light rays and the yellow illumination light rays. FIG. 3 illustrates, as an example, a state in which the phase difference plate 103 is arranged between the lens 132 and the lens 133. The phase difference plate 103 is arranged in a direction of converting linearly polarized light into circularly polarized light. The phase difference plate 103 is a λ/4 phase difference plate, for example.

The distribution of the brightness of the blue illumination light rays, and the red illumination light rays and the green illumination light rays included in the yellow illumination light rays at a position Pb where the blue illumination light rays and the yellow illumination light rays have passed through the phase difference plate 103 will be described with reference to FIGS. 9A, 9B, 10A, 10B, 11A, 11B, 12A, and 12B. FIGS. 9A, 9B, 10A, 10B, 11A, 11B, 12A, and 12B respectively correspond to FIGS. 5A, 5B, 6A, 6B, 7A, 7B, 8A, and 8B.

Figure 9A:
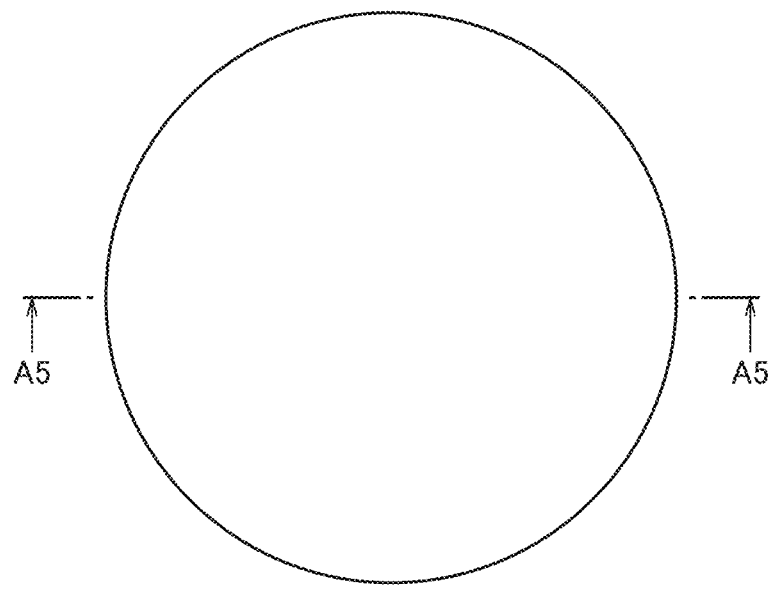
FIG. 9A is a diagram illustrating brightness distributions of red illumination light rays and green illumination light rays.
Figure 9B:
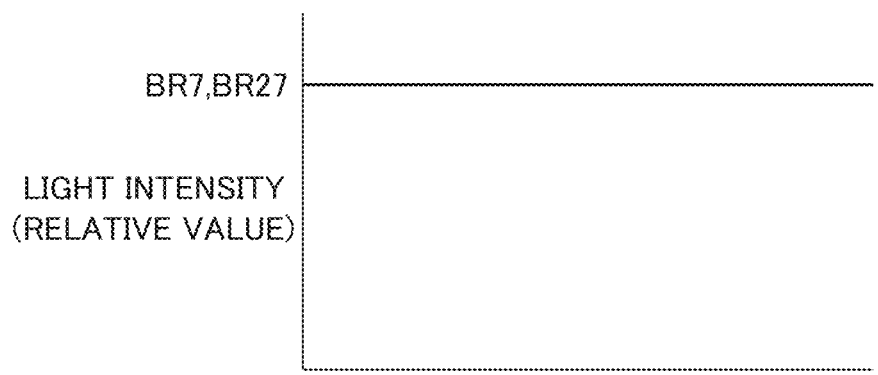
FIG. 9B is a diagram illustrating distributions of light intensities of red illumination light rays and green illumination light rays in A5-A5 illustrated in FIG. 9A.

FIG. 9A illustrates the distribution of the brightness of the red illumination light rays and the green illumination light rays included in the yellow illumination light rays in shades. FIG. 9B illustrates the distribution of the brightness of the red illumination light rays in A5-A5 illustrated in FIG. 9A and the green illumination light rays as the light intensity distribution. At the position Pb, as illustrated in FIG. 9A, the brightness (light intensity) distribution of the red illumination light rays and the green illumination light rays is uniform. As illustrated in FIG. 9B, the light intensity of the red illumination light rays and the green illumination light rays at the position Pb is defined as BR7.

Figure 10A:
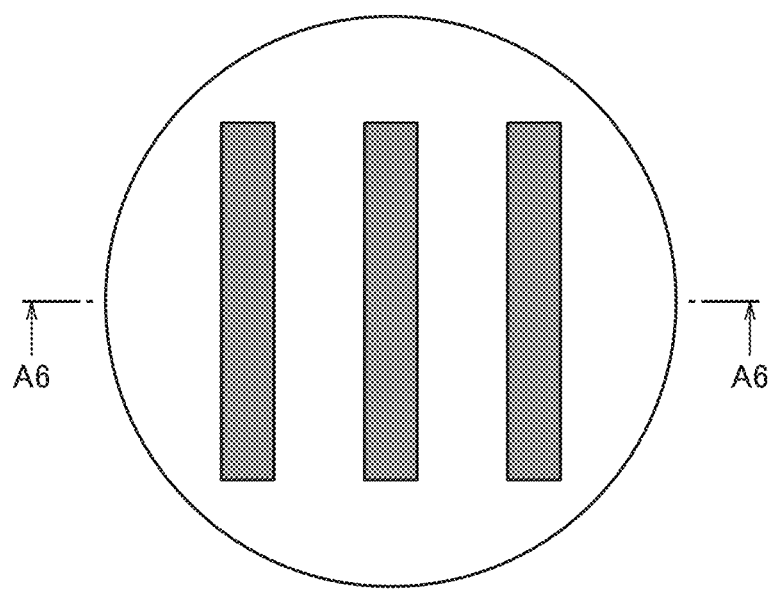
FIG. 10A is a diagram illustrating a brightness distribution of blue illumination light rays.
Figure 10B:
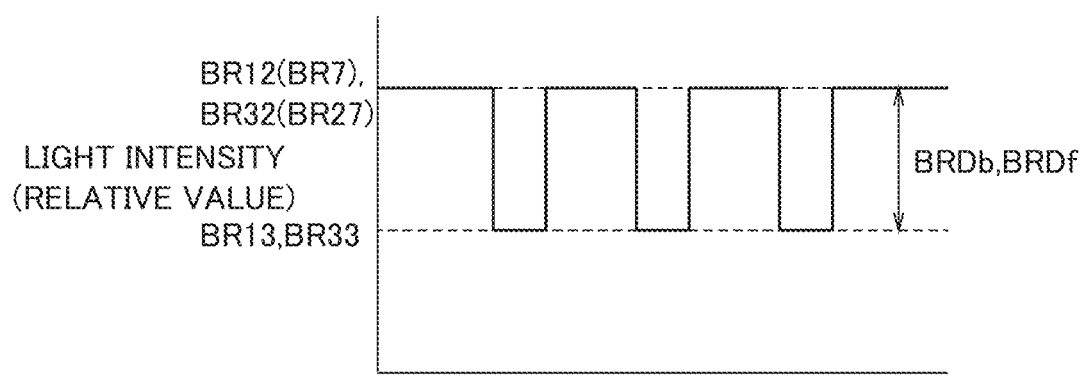
FIG. 10B is a diagram illustrating a distribution of a light intensity of blue illumination light rays in A6-A6 illustrated in FIG. 10A.
Figure 11A:
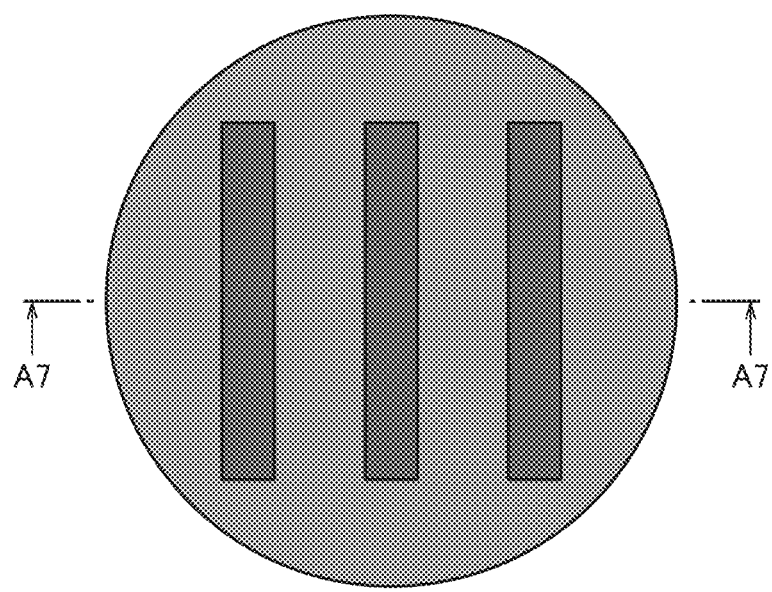
FIG. 11A is a diagram illustrating a brightness distribution of s-polarized light in blue illumination light rays.
Figure 11B:
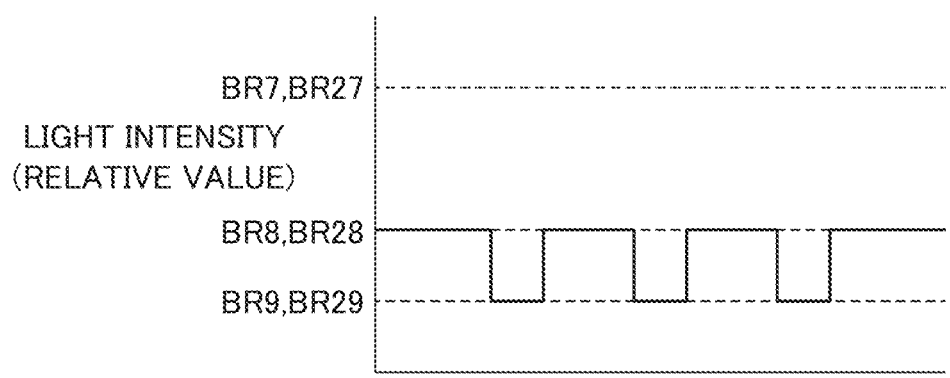
FIG. 11B is a diagram illustrating a distribution of a light intensity of s-polarized light in blue illumination light rays in A7-A7 illustrated in FIG. 11A.
Figure 12A:
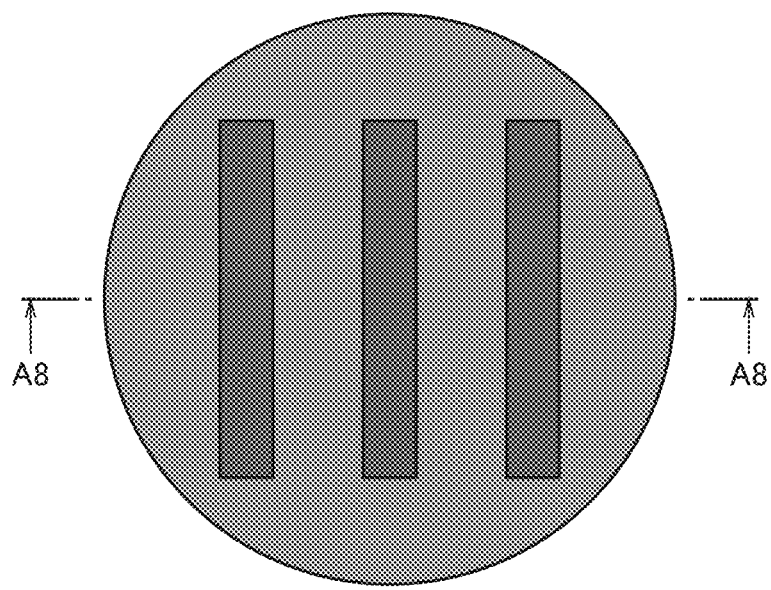
FIG. 12A is a diagram illustrating a brightness distribution of p-polarized light in blue illumination light rays.
Figure 12B:
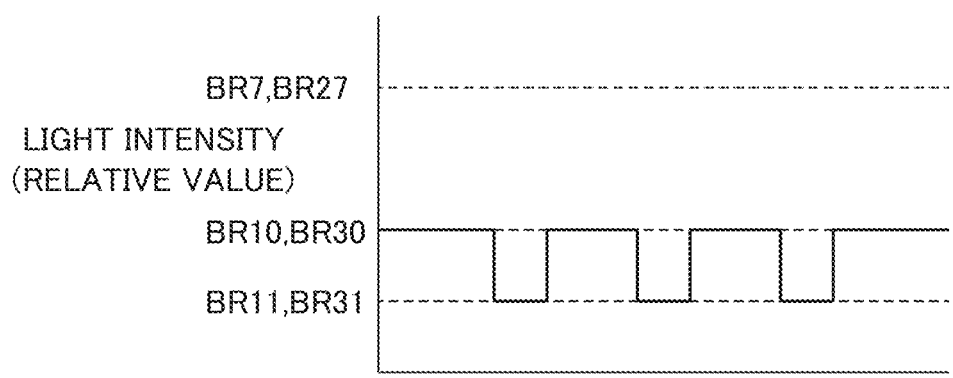
FIG. 12B is a diagram illustrating a distribution of a light intensity of p-polarized light in blue illumination light rays in A8-A8 illustrated in FIG. 12A.

FIG. 10A corresponds to FIG. 9A and illustrates the distribution of the brightness of the blue illumination light rays in shades. FIG. 10B illustrates the distribution of the brightness of the blue illumination light rays in A6-A6 illustrated in FIG. 10A as the light intensity distribution. FIG. 11A corresponds to FIG. 10A and illustrates the distribution of the brightness of s-polarized light in the blue illumination light rays in shades. FIG. 11B illustrates the distribution of the brightness or the s-polarized light of the blue illumination light rays in A7-A7 illustrated in FIG. 11A as the light intensity distribution. FIG. 12A corresponds to FIG. 10A and illustrates the distribution of the brightness of the p-polarized light in the blue illumination light rays in shades. FIG. 12B illustrates the distribution of the brightness of the p-polarized light in the blue illumination light rays in A8-A8 illustrated in FIG. 12A as the light intensity distribution.

The phase difference plate 103 converts the blue illumination light rays that are linearly polarized light into circularly polarized light. As illustrated in FIGS. 11A and 12A, the phase difference plate 103 converts the blue illumination light rays into circularly polarized light, thereby making the s-polarized light and the p-polarized light in the blue illumination light rays have the same brightness (light intensity) distribution. The s-polarized light and the p-polarized light in the blue illumination light rays have a the brightness (light intensity) distribution in which the region corresponding to the transmission areas 120T is darker than the red illumination light rays and the green illumination light rays, and the region corresponding to the specific polarization reflection areas 120R is even darker than the region corresponding to the transmission areas 120T.

That is, in the s-polarized light in the blue illumination light rays, as illustrated in FIG. 11B, the region corresponding to the transmission areas 120T has a light intensity BR8 (BR8<BR7) smaller than the light intensity BR7 of the red illumination light rays and the green illumination light rays, and the region corresponding to the specific polarization reflection areas 120R has a light intensity BR9 (BR9<BR8)

smaller than the light intensity BR8 of the region corresponding to the transmission areas 120T.

In the p-polarized light in the blue illumination light rays, as illustrated FIG. 12B, the region corresponding to the transmission areas 120T has a light intensity BR10 (BR10<BR7) smaller than the light intensity BR7 of the red illumination light rays and the green illumination light rays, and the region corresponding to the specific polarization reflection areas 120R has a light intensity BR11 (BR11<BR10) smaller than the light intensity BR10 of the region corresponding to the transmission areas 120T.

Accordingly, as illustrated in FIG. 10A, the blue illumination light rays including the s-polarized light having the brightness (light intensity) distribution illustrated in FIGS. 11A and 11B and the p-polarized light having the brightness (light intensity) distribution illustrated in FIGS. 12A and 12B have a brightness (light intensity) distribution in which the region corresponding to the transmission areas 120T has the same brightness as the red illumination light rays and the green illumination light rays, and the region corresponding to the specific polarization reflection areas 120R is darker than the red illumination light rays and the green illumination light rays.

That is, as illustrated in FIG. 10B, in the blue illumination light rays, the region corresponding to the transmission areas 120T has the same light intensity BR12 (BR12=BR7) as the light intensity BR7 of the red illumination light rays and the green illumination light rays, and the region corresponding to the specific polarization reflection areas 120R has a light intensity BR13 (BR13<BR12) smaller than the light intensity BR12 of the region corresponding to the transmission areas 120T. The difference between the light intensity BR12 and the light intensity BR13 of the blue illumination light rays at the position Pb is defined as a light intensity difference BRDb.

At the position Pb, it is preferable that the s-polarized light intensities BR8 and BR9 and the p-polarized light intensities BR10 and BR11 in the blue illumination light rays have the same value. At the position Pa where the blue illumination light rays pass through the dichroic mirror 120 and the position Pb where the blue illumination light rays pass through the phase difference plate 103, the light intensity difference BRDa and the light intensity difference BRDb are substantially the same values.

As illustrated in FIG. 3, the polarization conversion element 150 is arranged on the optical path of the blue illumination light rays and the yellow illumination light rays transmitted through the phase difference plate 103. The blue illumination light rays and the yellow illumination light rays transmitted through the phase difference plate 103 are incident on the polarization conversion element 150.

Figure 13:
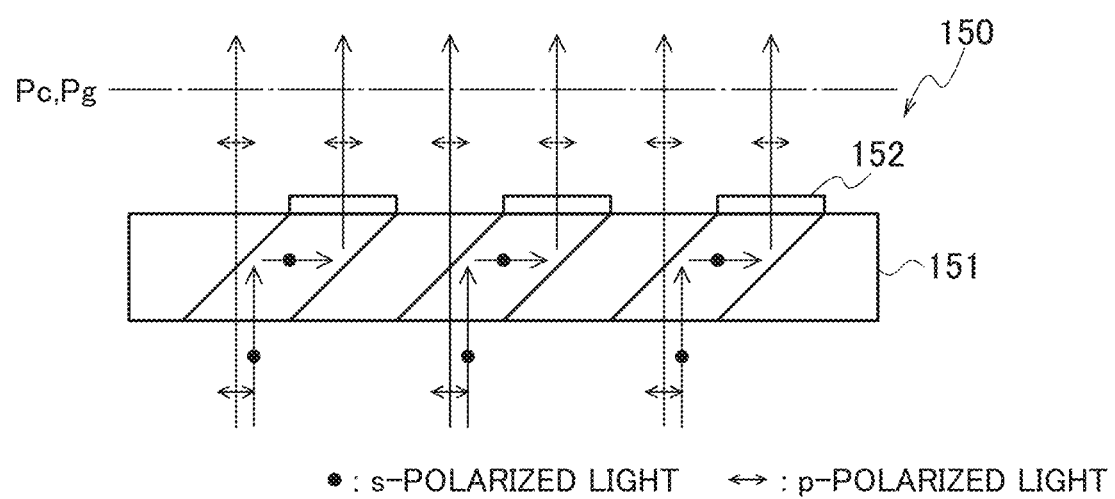
FIG. 13 is a configuration diagram illustrating an example of a polarization conversion element.

FIG. 13 illustrates a configuration example of the polarization conversion element 150. The polarization conversion element 150 includes a polarization beam splitter 151 and a phase difference plate 152. In a first embodiment, the phase difference plate 152 is defined as a second phase difference plate. The polarization beam splitter 151 reflects either s-polarized light or p-polarized light and transmits the other. FIG. 13 illustrates a state in which the polarization beam splitter 151 reflects s-polarized light and transmits p-polarized light.

The phase difference plate 152 converts either s-polarized light or p-polarized light into the other. FIG. 13 illustrates a state in which the phase difference plate 152 converts s-polarized light into p-polarized light. The phase difference plate 152 is a λ/2 phase difference plate, for example. The specific polarization reflection areas 120R of the dichroic mirrors 120 and the phase difference plate 152 of the polarization conversion element 150 correspond to each other.

The distribution of the brightness of the blue illumination light rays, and the red illumination light rays and the green illumination light rays included in the yellow illumination light rays at a position Pc where the blue illumination light rays and the yellow illumination light rays have passed through the polarization conversion element 150 will be described with reference to FIGS. 14A, 14B, 15A, 15B, 16A, 16B, 17A, and 17B. The position Pc corresponds to the position of an illumination pupil. FIGS. 14A, 14B, 15A, 15B, 16A, 16B, 17A, and 17B respectively correspond to FIGS. 9A, 9B, 10A, 10B, 11A, 11B, 12A, and 12B.

Figure 14A:
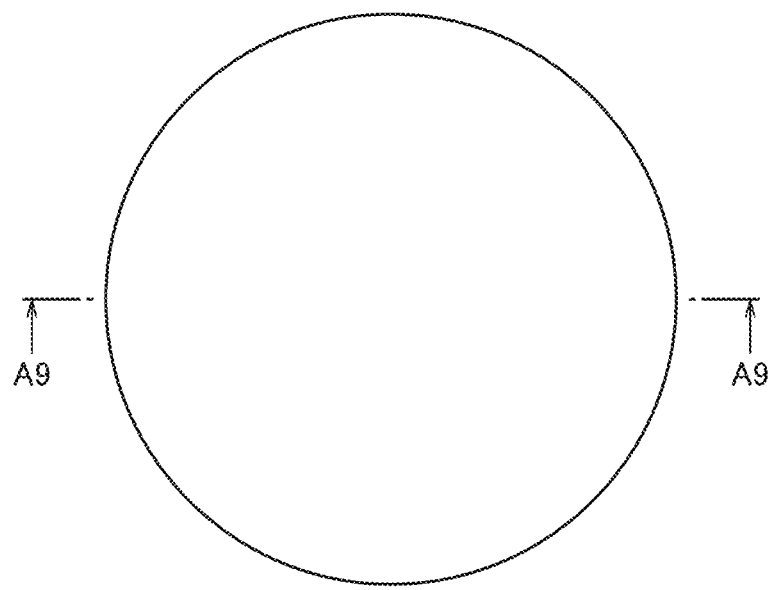
FIG. 14A is a diagram illustrating brightness distributions of red illumination light rays and green illumination light rays.
Figure 14B:
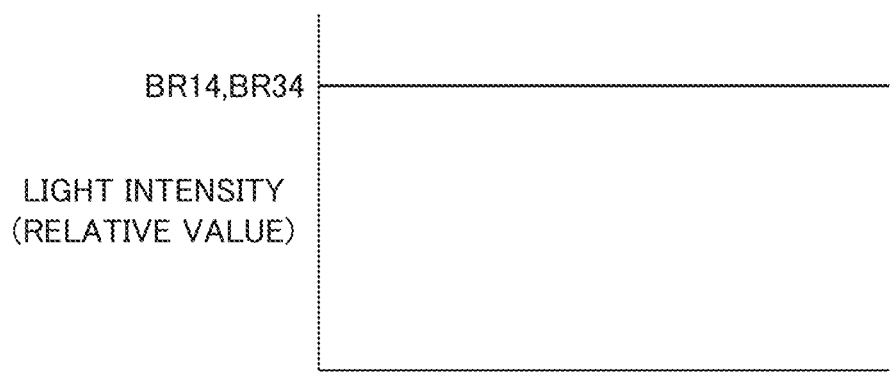
FIG. 14B is a diagram illustrating a distribution of light intensities of red illumination light rays and green illumination light rays in A9-A9 illustrated in FIG. 14A.

FIG. 14A illustrates the distribution of the brightness of the red illumination light rays and the green illumination light rays included in the yellow illumination light rays in shades. FIG. 14B illustrates the distribution of the brightness of the red illumination light rays and the green illumination light rays in A9-A9 illustrated in FIG. 14A as the light intensity distribution. The yellow illumination light rays are aligned to p-polarized light by the polarization conversion element 150. In the illumination pupil (position Pc), as illustrated in FIG. 14A, the brightness (light intensity) distribution of the red illumination light rays and the green illumination light rays is uniform. As illustrated in FIG. 14B, the light intensity of the red illumination light rays and the green illumination light rays in the illumination pupil is defined as BR14.

Figure 15A:
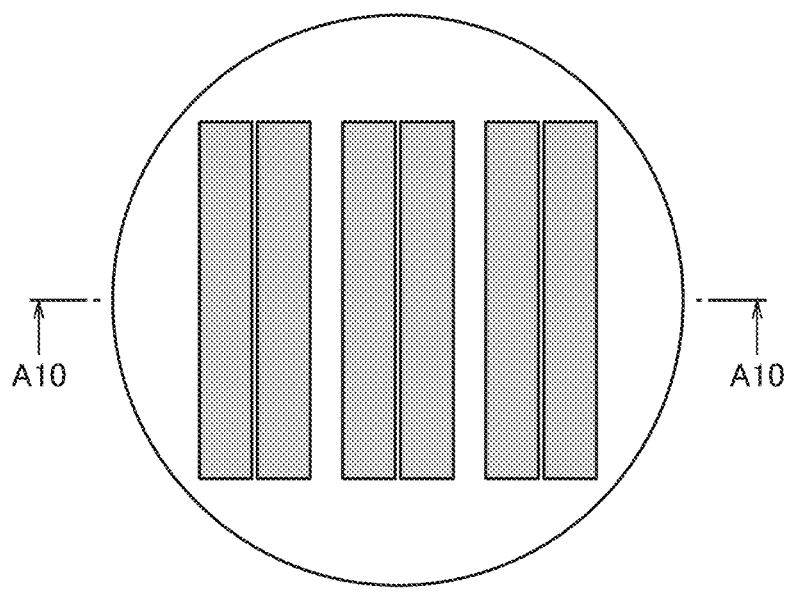
FIG. 15A is a diagram illustrating a brightness distribution of blue illumination light rays in an illumination pupil.
Figure 15B:
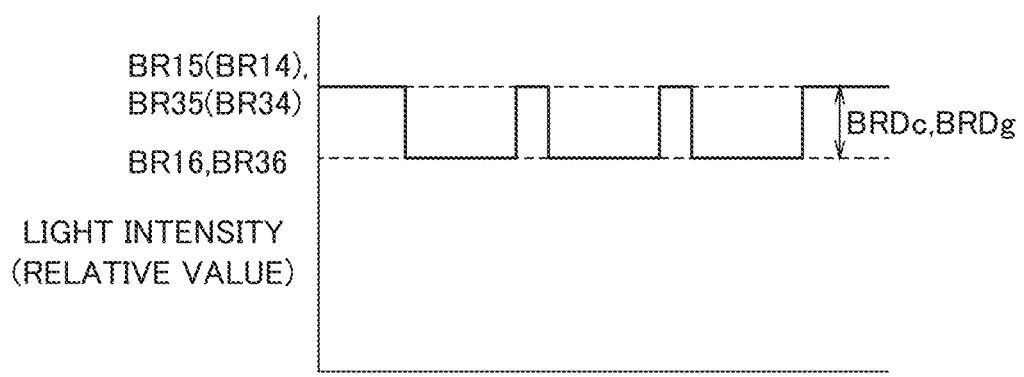
FIG. 15B is a diagram illustrating a distribution of a light intensity in blue illumination light rays in A10-A10 illustrated in FIG. 15A.
Figure 16A:
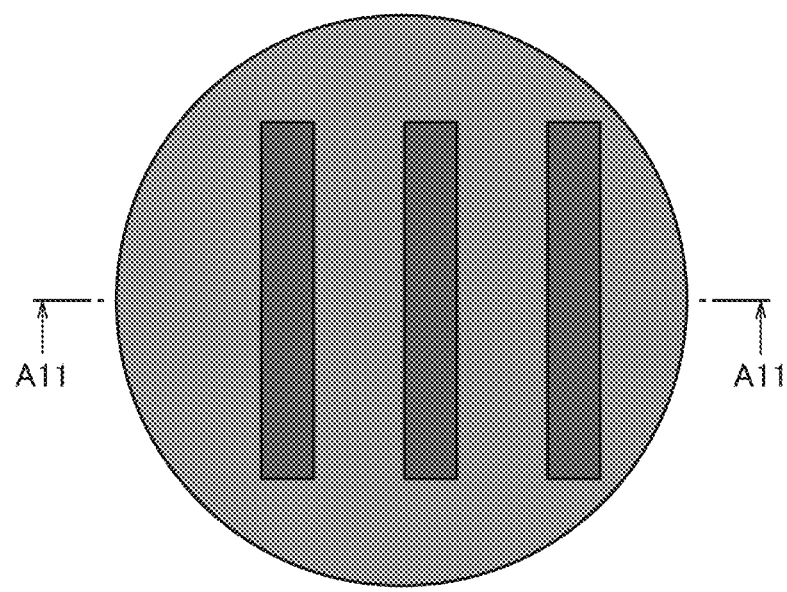
FIG. 16A is a diagram illustrating a brightness distribution of blue illumination light rays in the illumination pupil.
Figure 16B:
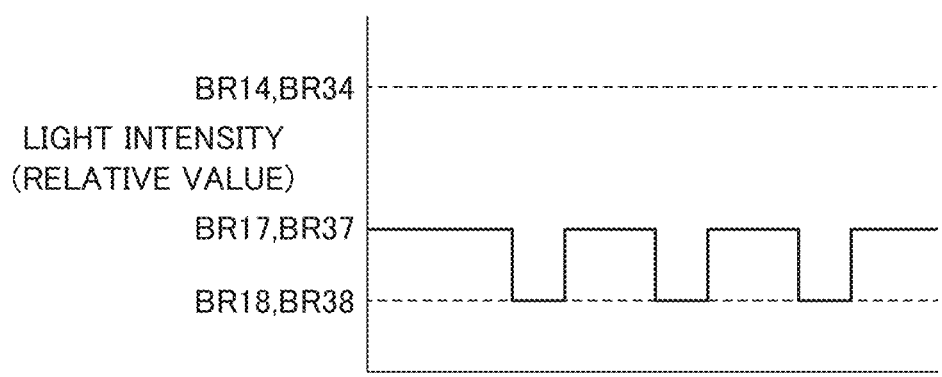
FIG. 16B is a diagram illustrating a distribution of a light intensity of blue illumination light rays in A11-A11 illustrated in FIG. 16A.
Figure 17A:
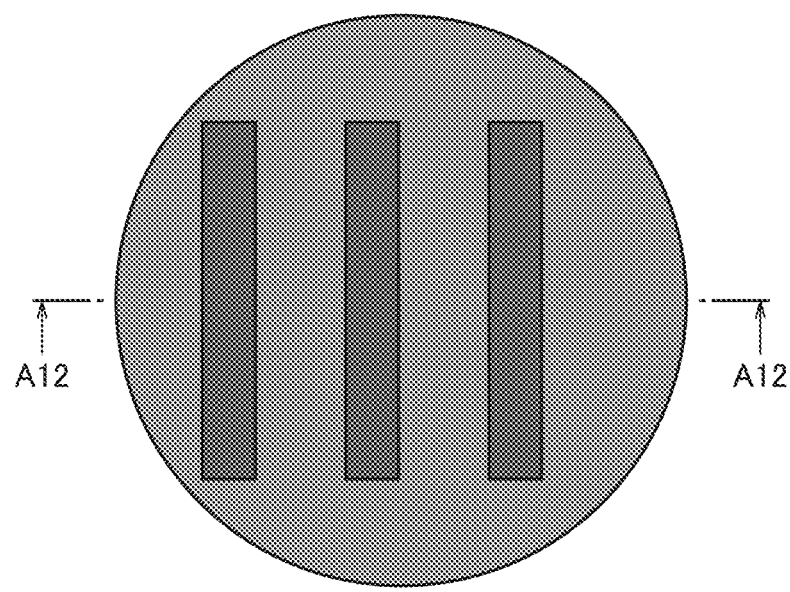
FIG. 17A is a diagram illustrating a brightness distribution of blue illumination light rays in the illumination pupil.
Figure 17B:
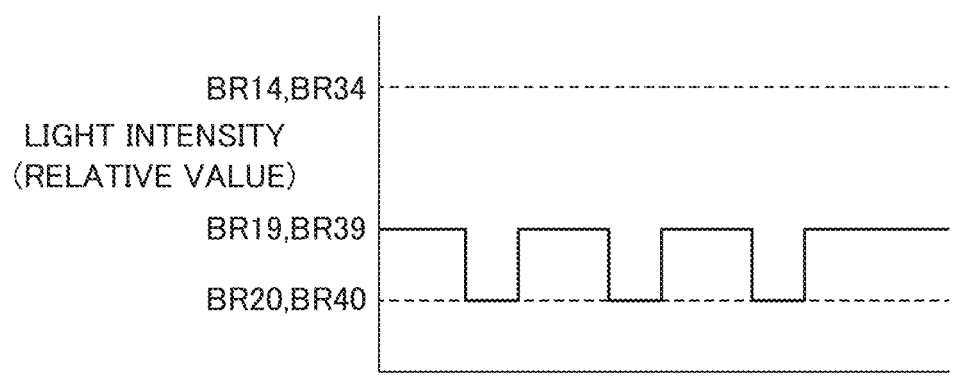
FIG. 17B is a diagram illustrating a distribution of a light intensity of blue illumination light rays in A12-A12 illustrated in FIG. 17A.

FIG. 15A corresponds to FIG. 14A and illustrates the distribution of the brightness of the blue illumination light rays in the illumination pupil (position Pc) in shades. FIG. 15B illustrates the distribution of the brightness of the blue illumination light rays in A10-A10 illustrated in FIG. 15A as the light intensity distribution. FIGS. 16A and 17A correspond to FIG. 15A and illustrate the distribution of the brightness of the blue illumination light rays in shades. FIG. 16B illustrates the distribution of the brightness of the blue illumination light rays in A11-A11 illustrated in FIG. 16A as the light intensity distribution. FIG. 17B illustrates the distribution of the brightness of the blue illumination light rays in A12-A12 illustrated in FIG. 17A as the light intensity distribution.

FIGS. 16A and 16B correspond to FIGS. 11A and 11B. The brightness (light intensity) distribution of the blue illumination light rays illustrated in FIGS. 16A and 16B corresponds to the brightness (light intensity) distribution of the s-polarized light in the blue illumination light rays incident on the polarization conversion element 150. FIGS. 17A and 17B correspond to FIGS. 12A and 12B respectively. The brightness (light intensity) distribution of the blue illumination light rays illustrated in FIGS. 17A and 17B corresponds to the brightness (light intensity) distribution of the p-polarized light in the blue illumination light rays incident on the polarization conversion element 150.

As illustrated in FIG. 13, the polarization conversion element 150 transmits p-polarized light. As illustrated in FIG. 17A, the p-polarized light in the blue illumination light rays incident on the polarization conversion element 150 has a brightness (light intensity) distribution in which the region corresponding to the transmission areas 120T is darker than the red illumination light rays and the green illumination light rays, and the region corresponding to the specific polarization reflection areas 120R is darker than the region corresponding to the transmission areas 120T, and the p-polarized light transmit the polarization conversion element 150.

That is, as illustrated in FIG. 17B, in the p-polarized light in the blue illumination light rays incident on the polarization conversion element 150, the region corresponding to the transmission areas 120T has a light intensity BR19 (BR19<BR14) smaller than the light intensity BR14 of the red illumination light rays and the green illumination light rays, and the region corresponding to the specific polarization reflection areas 120R has a light intensity BR20 (BR20<BR19) smaller than the light intensity BR19 in the region corresponding to the transmission areas 120T, and the p-polarized light transmit the polarization conversion element 150.

As illustrated in FIG. 13, the polarization conversion element 150 shifts the optical axis of the s-polarized light in a reflection direction by reflecting the s-polarized light incident on the polarization conversion element 150 in the polarization beam splitter 151. The polarization conversion element 150 converts s-polarized light into p-polarized light by the phase difference plate 152. Therefore, the blue illumination light rays are aligned to p-polarized light by the polarization conversion element 150.

As illustrated in FIGS. 16A and 16B, the s-polarized light in the blue illumination light rays incident on the polarization conversion element 150 are emitted from the polarization conversion element 150 as p-polarized blue illumination light rays having a brightness (light intensity) distribution in which the brightness (light intensity) distribution illustrated in FIGS. 11A and 11B is shifted in the reflection direction by the polarization conversion element 150.

The s-polarized light in the blue illumination light rays incident on the polarization conversion element 150 become p-polarized blue illumination light rays having the brightness (light intensity) distribution in which the region corresponding to the transmission areas 120T is darker than the red illumination light rays and the green illumination light rays, and the region corresponding to the specific polarization reflection areas 120R is darker than the region corresponding to the transmission area 120T, and the p-polarized blue illumination light rays are emitted from the polarization conversion element 150.

That is, as illustrated in FIG. 16B, the s-polarized light in the blue illumination light rays incident on the polarization conversion element 150 become the p-polarized blue illumination light rays where the region corresponding to the transmission areas 120T has a light intensity BR17 (BR17<BR14) smaller than the light intensity BR14 of the red illumination light rays and the green illumination light rays, and the region corresponding to the specific polarization reflection areas 120R has a light intensity BR18 (BR18<BR17) smaller than the light intensity BR17 in the region corresponding to the transmission areas 120T, and the p-polarized blue illumination light rays are emitted from the polarization conversion element 150.

Therefore, as illustrated in FIG. 15A, the blue illumination light rays aligned to p-polarized light by the polarization conversion element 150 have the brightness (light intensity) distribution in which the region corresponding to the transmission areas 120T has the same brightness as the red illumination light rays and the green illumination light rays, and the region corresponding to the specific polarization reflection areas 120R is darker than the red illumination light rays and the green illumination light rays.

That is, as illustrated in FIG. 15B, in the blue illumination light rays emitted from the polarization conversion element 150, the region corresponding to the transmission areas 120T has the same light intensity BR15 (BR15=BR14) as the light intensity BR14 of the red illumination light rays and the green illumination light rays, and the region corresponding to the specific polarization reflection areas 120R has a light intensity BR16 (BR16<BR15) smaller than the light intensity BR15 in the region corresponding to the transmission areas 120T. The difference between the light intensity BR15 and the light intensity BR16 of the blue illumination light rays in the illumination pupil (position Pc) is defined as a light intensity difference BRDc.

In the projector 100 and the multi-projection system 1 using the projector 100, the blue illumination light rays emitted from the plurality of blue laser elements BL forming the light source 101 are converted from linearly polarized light to circularly polarized light by the phase difference plate 103, and then the polarization conversion element 150 transmits the p-polarized light in the blue illumination light rays and shifts the optical axis of the s-polarized light.

Therefore, according to the projector 100 and the multi-projection system 1, since the light intensity difference BRDc of the blue illumination light rays at the illumination pupil (position Pc) can be made smaller than the light intensity differences BRDa and BRDb of the blue illumination light rays at the positions Pa and Pb, it is possible to reduce the variation in the brightness of the blue illumination light rays.

As illustrated in FIG. 3, the dichroic mirror 105 is arranged on the optical path of the blue illumination light rays and the yellow illumination light rays transmitted through the polarization conversion element 150. The blue illumination light rays and the yellow illumination light rays aligned to P-polarized light by the polarization conversion element 150 are irradiated onto the dichroic mirror 105 via the lens 134. The lens 134 is a condenser lens, for example. The dichroic mirror 105 separates the incident blue illumination light rays and the yellow illumination light rays.

Yellow illumination light rays YLL separated by the dichroic mirror 105 are reflected by the reflection mirror 142. The dichroic mirror 106 is arranged on the optical path of the yellow illumination light rays YLL. The yellow illumination light rays YLL reflected by the reflection mirror 142 is irradiated onto the dichroic mirror 106. The dichroic mirror 106 separates incident light rays by reflection and transmission with the separation wavelength as the separation boundary.

The dichroic mirror 106 separates the yellow illumination light YLL into red illumination light rays RLL containing red band components and green illumination light rays GLL containing green band components. In FIG. 3, the dichroic mirror 106 reflects the green illumination light rays GLL and transmits the red illumination light rays RLL with respect to the incident yellow illumination light rays YLL to separate to the green illumination light rays GLL and the red illumination light rays RLL. Here, the reflectance of the green illumination light rays GLL and the transmittance of the red illumination light rays RLL are 100% on the short wavelength side and 100% on the long wavelength side with the separation wavelength as a boundary.

At wavelengths near the separation wavelength, the reflectance of the green illumination light rays GLL and the transmittance of the red illumination light rays RLL become small, so it can be said that the separation boundary has a width centered on the separation wavelength. Depending on the width of this separation boundary, the red illumination light rays RLL contain components in the green wavelength band and the green illumination light rays GLL contain components in the red wavelength band. It is ideal from the viewpoint of light energy utilization efficiency that there is no width of the separation boundary.

The red illumination light rays RLL separated by the dichroic mirror 106 are irradiated onto the reflective polarizing plate 107R via the lens 135. The green illumination light rays GLL separated by the dichroic mirror 106 are irradiated onto the reflective polarizing plate 107G via the lens 136. The blue illumination light rays BLL separated by the dichroic mirror 105 are reflected by the reflection mirror 143 and irradiated onto the reflective polarizing plate 107B via the lens 137.

The reflective polarizing plates 107R, 107G, and 107B reflect either s-polarized light or p-polarized light and transmit the other. FIG. 3 illustrates a state in which the reflective polarizing plates 107R, 107G, and 107B reflect s-polarized light and transmit p-polarized light. Wire grids may be used as the reflective polarizing plates 107R, 107G, and 107B. The red illumination light rays RLL, the green illumination light rays GLL, and the blue illumination light rays BLL, which are p-polarized light, respectively pass through the reflective polarizing plates 107R, 107G, and 107B and are irradiated onto the image display elements 108R, 108G, and 108B, respectively.

The image display element 108R photomodulates the red illumination light rays RLL based on the image data of the red components to generate s-polarized red image light rays RML. The image display element 108G photomodulates the green illumination light rays GLL based on the image data of the green components to generate s-polarized green image light rays GML. The image display element 108B photomodulates the blue illumination light rays BLL based on the image data of the blue components to generate the s-polarized blue image light rays BML. That is, the image display element 108R functions as a light modulation element for a red image, the image display element 108G functions as a light modulation element for a green image, and the image display element 108B functions as a light modulation element for a blue image.

The red image light rays BML, the green image light rays GML, and the blue image light rays BML generated by the image display elements 108R, 108G, and 108B are respectively reflected by the reflective polarizing plates 107R, 107G, and 107B and are irradiated onto the color combining prism 109. The color combining prism 109 reflects the red image light rays RML and the blue image light rays BML and transmits the green image light rays GML to combine the red image light rays RML, the green image light rays GML, and the blue image light rays BML.

The red image light rays RML, the green image light rays GML, and the blue image light rays BML synthesized by the color combining prism 109 are projected onto the screen SRN or the like via the aperture 110 and the projection lens 111 as illustrated in FIG. 1 or 3. As a result, the projector 100 displays the full-color image IM in which the red image light rays RML, the green image light rays GML, and the blue image light rays BML are combined on the screen SRN or the like.

As illustrated in FIG. 3, the position Pd of the aperture 110 corresponds to the position of the projection pupil. The illumination pupil and the projection pupil have conjugate relationship. Therefore, the brightness distribution of the red image light rays RML, the green image light rays GML, and the blue image light rays BML at the position Pd corresponding to the position of the projection pupil corresponds to the brightness distribution of the red illumination light rays RLL, the green illumination light rays GLL, and the blue illumination light rays BLL at the position Pc corresponding to the position of the illumination pupil.

A comparative example is a state in which the phase difference plate 103 is not arranged. In the comparative example, the brightness distribution of the red image light rays RML, the green image light rays GML, and the blue image light rays BML at the position Pd corresponding to the position of the projection pupil corresponds to the brightness distribution of the red illumination light rays RLL, the green illumination light rays GLL, and the blue illumination right rays BLL at the position Pa.

Therefore, according to the projector 100 and the multi-projection system 1, by converting the blue illumination light rays BLL into circularly polarized light by the phase difference plate 103, and further shifting the optical axis of the s-polarized light of the blue illumination light rays by the polarization conversion element 150, it is possible to reduce the variation in the brightness of the blue image light rays BLL in the projection pupil as compared with the comparative example.

Consequently, according to the projector 100 and the multi-projection system 1, the color distribution caused by the light shielding plate 10 can be reduced by reducing the variation in the brightness of the blue image light rays BLL in the projection pupil. According to the projector 100 and the multi-projection system 1, when the projector 100 includes the blue laser element and the phosphor 102 which are a plurality of illumination light sources, deterioration of the quality of the multi-projection image can be suppressed.

Second Embodiment

Figure 18:
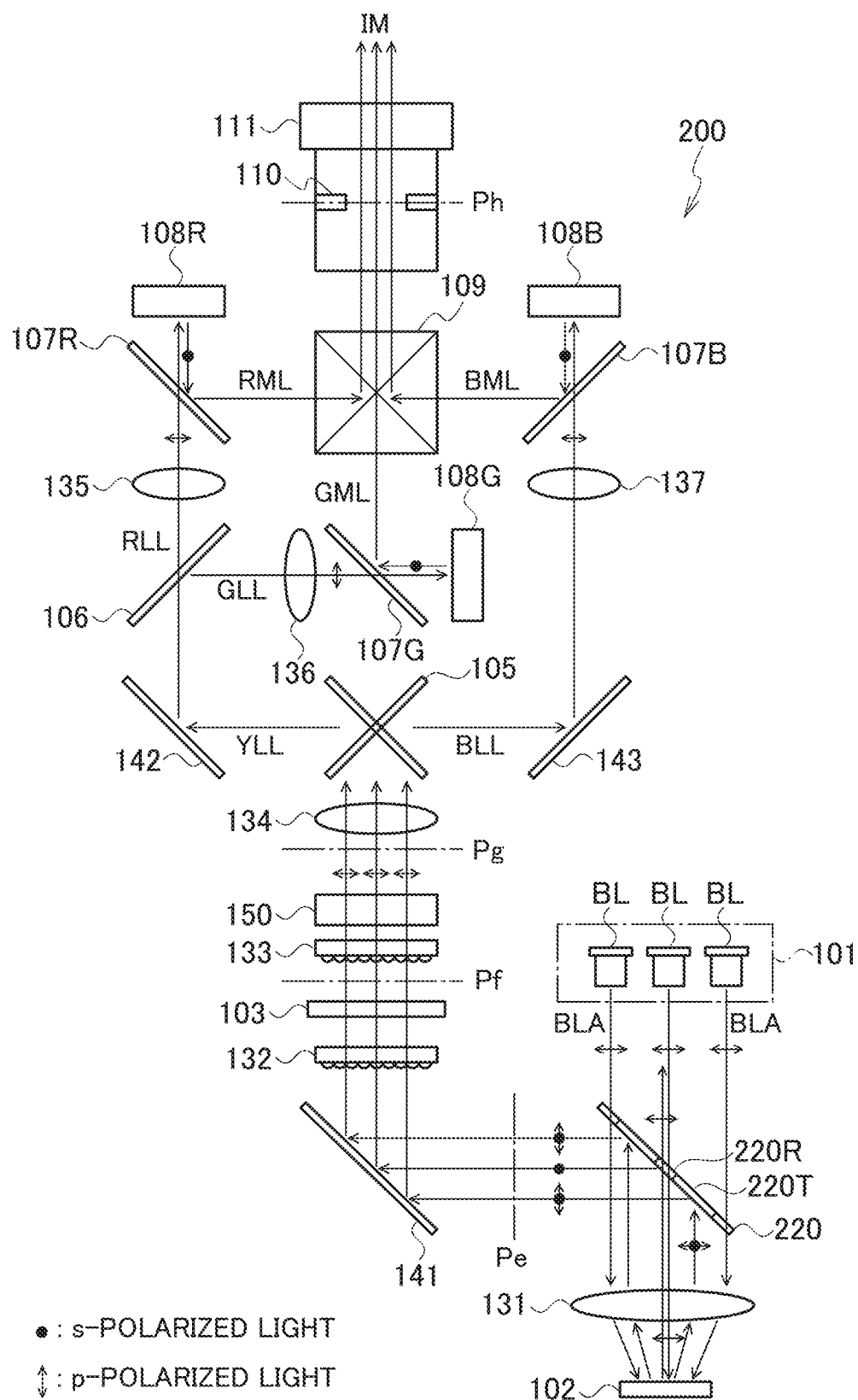
FIG. 18 is a configuration diagram illustrating an example of a projector according to a second embodiment.

A configuration example of the projector PJ will be described with reference to FIG. 18. A projector 200 according to a second embodiment illustrated in FIG. 18 corresponds to the projector PJ (PJa and PJb) illustrated in FIGS. 1, 2A, and 2B. FIG. 18 corresponds to FIG. 3. To make the explanation easier to understand, the similar components as that of the projector 100 according to a first embodiment are designated by the same reference numerals and letters.

The projector 200 according to a second embodiment is different from the projector 100 according to a first embodiment in the configuration of a dichroic mirror 220 corresponding to the dichroic mirrors 120 and the positional relationship between the light source 101 and the phosphor 102 with respect to the dichroic mirror 220.

As illustrated in FIG. 18, the projector 200 includes a light source 101, a phosphor 102, the dichroic mirror 220, lenses 131 to 137, reflection mirrors 141 to 143, a phase difference plate 103, and a polarization conversion element 150. In a second embodiment, the phase difference plate 103 is defined as the first phase difference plate.

Further, the projector 200 includes dichroic mirrors 105 and 106, reflective polarizing plates 107R, 107G, and 107B, image display elements 108R, 108G, and 108B, a color combining prism 109, an aperture 110, and a projection lens 111.

In a second embodiment, the dichroic mirror 220 is defined as a first dichroic mirror, the dichroic mirror 105 is defined as a second dichroic mirror, and the dichroic mirror 106 is defined as a third dichroic mirror.

The light source 101 emits blue laser light rays from each of a plurality of blue laser elements BL. The blue laser light rays are s-polarized or p-polarized linearly polarized light. FIG. 18 illustrates a case where the blue laser light rays are p-polarized linearly polarized light. The dichroic mirror 220 is irradiated with the blue laser light rays. In a second embodiment, the light source 101 is defined as a first illumination light source and the blue laser light ray is defined as a first illumination light ray. Further, the s-polarized light is defined as a first polarized light and the p-polarized light is defined as a second polarized light.

The dichroic mirror 220 arranged so that the polarization direction of the blue laser light ray is s-polarized with respect to the dichroic mirror 220. The dichroic mirror 220 has an optical property of reflecting s-polarized light and transmitting p-polarized light with respect to blue laser light rays. The blue laser light rays emitted from the light source 101 pass through the dichroic mirror 220, are further condensed by the lens 131, and the phosphor 102 is irradiated with the blue laser light rays.

The phosphor 102 has a fluorescent layer and a reflective surface. The fluorescent layer generates yellow illumination light rays including a red band component and a green band component having an intensity corresponding to the energy intensity of the light emitted from the light source 101, specifically, corresponding to the energy intensity of the blue laser light rays emitted from the light source 101. The reflective surface reflects the blue laser light rays transmitted through the fluorescent layer and the yellow illumination light rays generated by the fluorescent layer.

In a second embodiment, the phosphor 102 is defined as second illumination light source, and the yellow illumination light ray is defined as a second illumination light. Therefore, the projector 200 includes the light source 101 (blue laser element BL) which is the first illumination light source and the phosphor 102 which is the second illumination light source as a plurality of illumination light sources.

The yellow illumination light rays which are the fluorescence rays generated by the phosphor 102 are irradiated onto the dichroic mirror 220 via the lens 131. A part of the blue laser light rays is diffused by the phosphor 102 and becomes a random polarized light in which a plurality of polarized light are mixed, and then is irradiated onto the dichroic mirror 220 via the lens 131. That is, the dichroic mirror 220 is arranged on the optical path of the blue laser light rays and the yellow illumination light rays. The dichroic mirror 220 has an optical property of reflecting yellow illumination light rays.

Figure 19A:
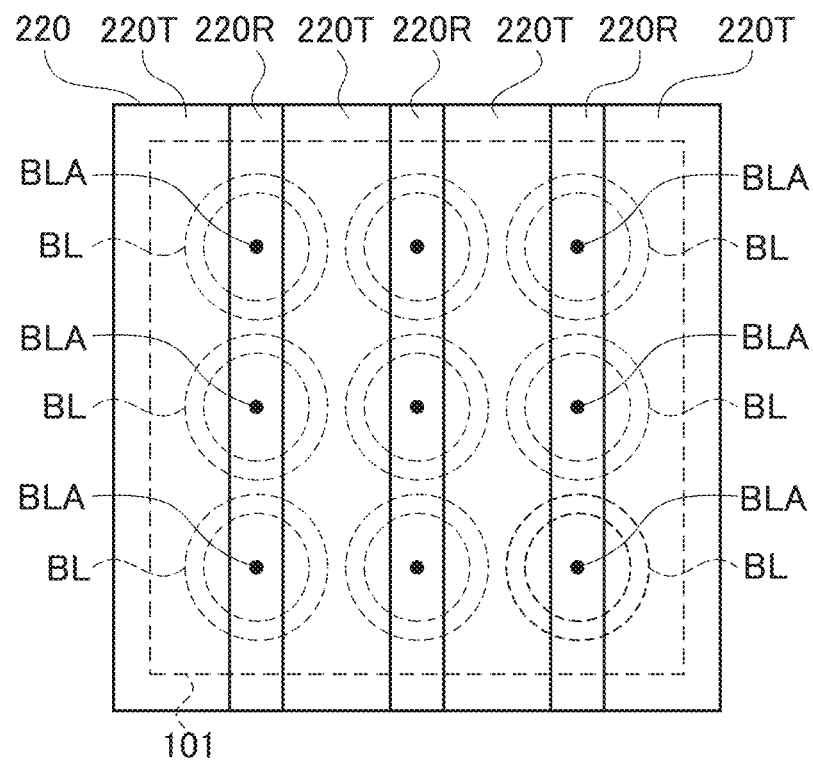
FIG. 19A is a configuration diagram illustrating an example of a dichroic mirror in the projector according to a second embodiment.

FIG. 19A illustrates a configuration example of the dichroic mirror 220. FIG. 19A illustrates a state in which the dichroic mirror 220 is viewed from the side opposite to the light source 101, that is, a state in which the dichroic mirror 220 is viewed from the lower side in FIG. 18. The dichroic mirror 220 has a specific polarization reflection areas 220R and a total reflection areas 220T.

The specific polarization reflection areas 220R transmit the p-polarized light in the blue laser light rays and reflect the s-polarized light in the blue laser light rays and the yellow illumination light rays. The total reflection areas 220T reflect all the polarized light including the s-polarized light and the p-polarized light in the blue laser light rays and the yellow illumination light rays.

The specific polarization reflection area 220R is arranged on the optical axis BLA of the blue laser element BL. The specific polarization reflection area 220R is formed so as to have an area larger than the luminous flux width of the blue laser light ray. Therefore, all of the blue laser light rays emitted from the plurality of blue laser elements BL pass through the dichroic mirror 220 and the lens 131 is irradiated with the blue laser light rays. Further, the blue laser light rays are condensed by the lens 131 and are irradiated onto the phosphor 102.

The specific polarization reflection area 220R is formed so as to have an area smaller than the luminous flux width of the diffused light rays emitted from the phosphor 102 through the lens 131. Of the blue laser light rays emitted from the phosphor 102 to the specific polarization reflection areas 220R, the s-polarized light component is reflected toward the reflection mirror 141 by the specific polarization reflection areas 220R. Of the blue laser light rays emitted from the phosphor 102 to the specific polarization reflection areas 220R, the p-polarized light component passes through the specific polarization reflection areas 220R and is returned to the light source 101.

The blue laser light rays emitted from the phosphor 102 and irradiated onto the total reflection areas 220T are reflected by the total reflection areas 220T toward the reflection mirror 141. The blue laser light rays reflected toward the reflection mirror 141 by the dichroic mirror 220 are defined as blue illumination light rays.

Figure 19B:
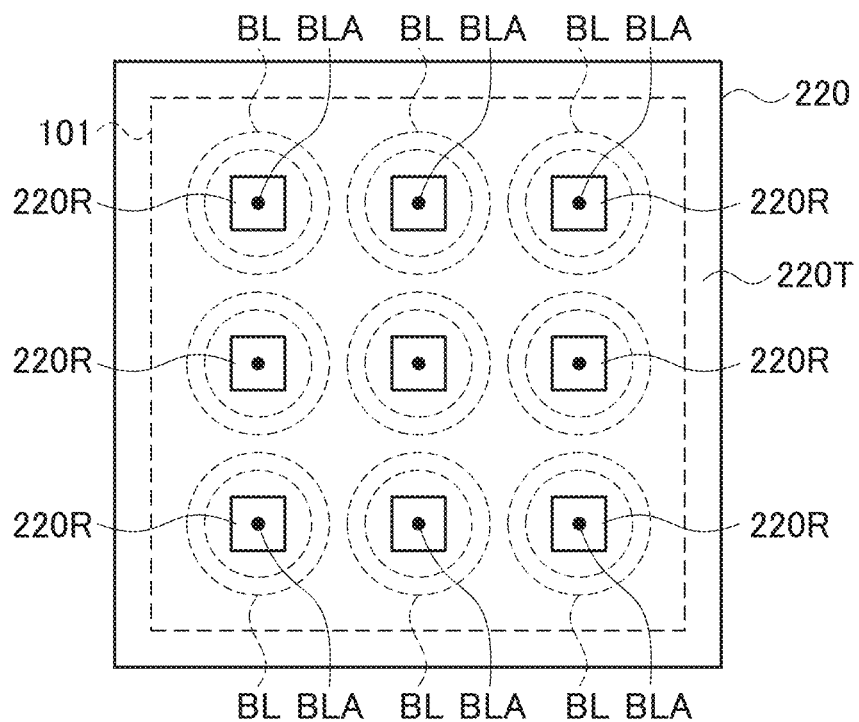
FIG. 19B is a configuration diagram illustrating another example of the dichroic mirror in the projector according to a second embodiment.

The yellow illumination light rays emitted from the phosphor 102 and irradiated onto the dichroic mirror 220 via the lens 131 are reflected toward the reflection mirror 141 by the specific polarization reflection areas 220R and the total reflection areas 220T. As illustrated in FIG. 19B, the dichroic mirror 220 may be configured such that the specific polarization reflection areas 220R are arranged on the optical axes BLA of the blue laser element BL and the region other than the specific polarization reflection areas 220R is defined as a total reflection area 220T.

The dichroic mirror 220 can be manufactured by forming a dielectric multilayer film, for example, in the region to be the specific polarization reflection areas 220R, and by forming a reflective film such as a metal film or a dielectric multilayer film in the region to be the total reflection area (areas) 220T, using a transparent material such as a glass plate or a prism. The optical properties of the specific polarization reflection area 220R can be set according to the material and film thickness of the dielectric material forming the dielectric multilayer film.

The distribution of the brightness of the blue illumination light rays, and the red illumination light rays and the green illumination light rays included in the yellow illumination light rays at a position Pe where the blue illumination light rays and the yellow illumination light rays have reflected by the dichroic mirror 220 will be described with reference to FIGS. 20A, 20B, 21A, 21B, 22A, 22B, 23A, and 23B. Note that FIGS. 20A, 20B, 21A, 21B, 22A, 22B, 23A, and 23B illustrate a case where the dichroic mirror 220 has the shape illustrated in FIG. 19A.

The position Pe illustrated in FIG. 18 corresponds to the position Pa illustrated in FIG. 3. The region corresponding to the specific polarization reflection areas 220R at the position Pe corresponds to the region corresponding to the specific polarization reflection areas 120R at the position Pa. The region corresponding to the total reflection areas 220T at the position Pe corresponds to the region corresponding to the transmission areas 120T at the position Pa.

Figure 20A:
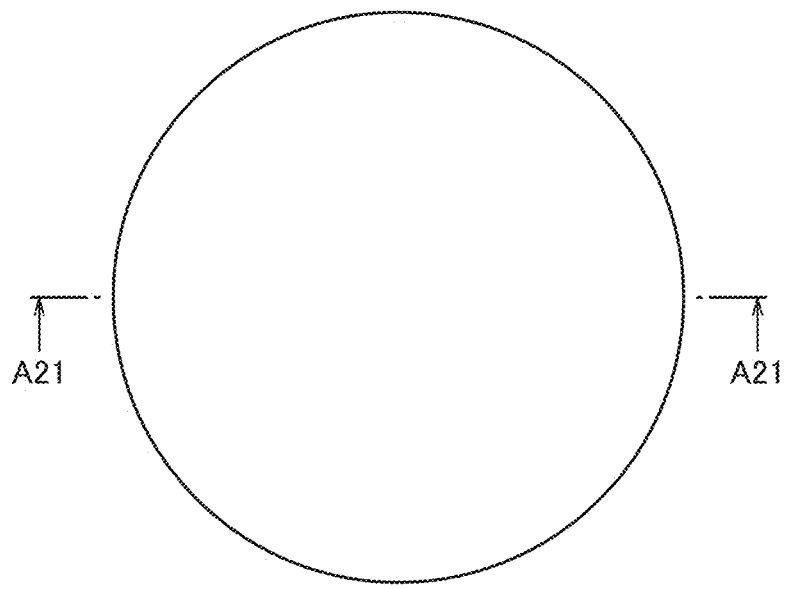
FIG. 20A is a diagram illustrating brightness distributions of red illumination light rays and green illumination light rays.

FIG. 20A illustrates the distribution of the brightness of the red illumination light rays and the green illumination light rays included in the yellow illumination light rays at the position Pe in shades. FIG. 21B illustrates the distribution of the brightness of the red illumination light rays and the green illumination light rays in A21-A21 illustrated in FIG. 20A as the light intensity distribution. The red illumination light rays are composed of the red band components contained in the yellow illumination light rays and the green illumination light rays are composed of the green band components contained in the yellow illumination light rays.

Figure 20B:
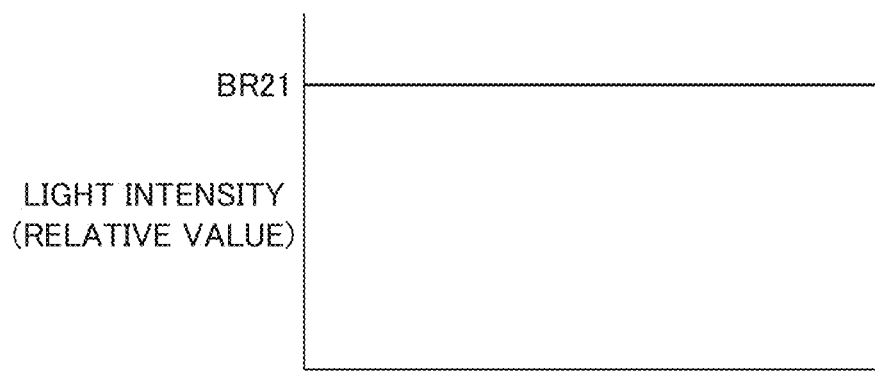
FIG. 20B is a diagram illustrating distributions of light intensities of red illumination light rays and green illumination light rays in A21-A21 illustrated in FIG. 20A.

The yellow illumination light rays are reflected at the specific polarization reflection areas 220R and the total reflection areas 220T of the dichroic mirror 220. Therefore, at the position Pe, as illustrated in FIG. 20A or 20B, the brightness (light intensity) distribution of the red illumination light rays and the green illumination light rays is uniform. The light intensity of the red illumination light rays and the green illumination light rays at the position Pe is set as a BR21.

The brightness (light intensity) distribution of the red illumination light rays and the green illumination light rays illustrated in FIGS. 20A and 20B corresponds to the brightness (light intensity) distribution of the red illumination light rays and the green illumination light rays illustrated in FIGS. 5A and 5B. The light intensity BR21 of the red illumination light rays and the green illumination light rays at the position Pe corresponds to the light intensity BR1 of the red illumination light rays and the green illumination light rays at the position Pa.

Figure 21A:
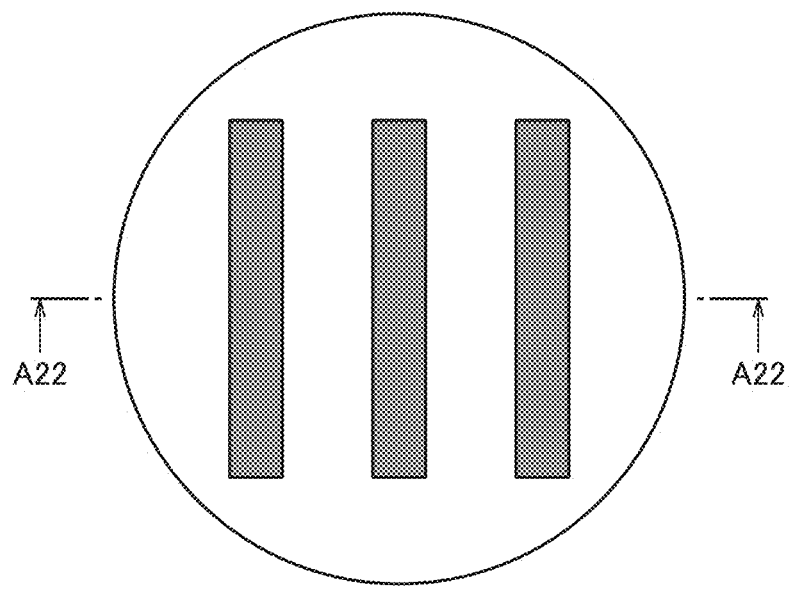
FIG. 21A is a diagram illustrating a brightness distribution of blue illumination light rays.
Figure 21B:
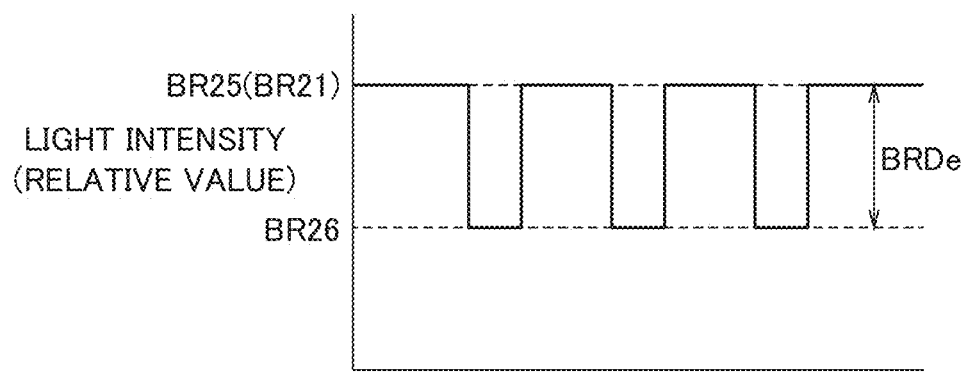
FIG. 21B is a diagram illustrating a distribution of a light intensity of blue illumination light rays in A22-A22 illustrated in FIG. 21A.
Figure 22A:
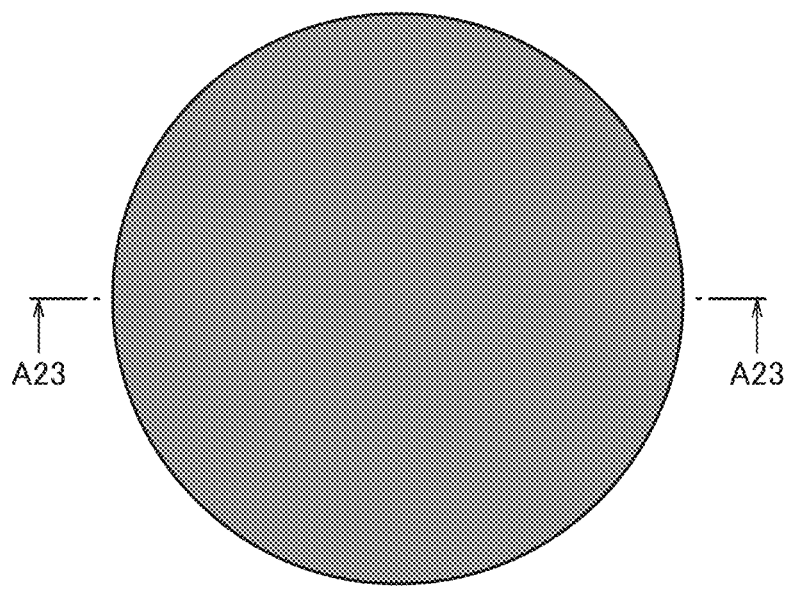
FIG. 22A is a diagram illustrating a brightness distribution of s-polarized light in blue illumination light rays.
Figure 22B:
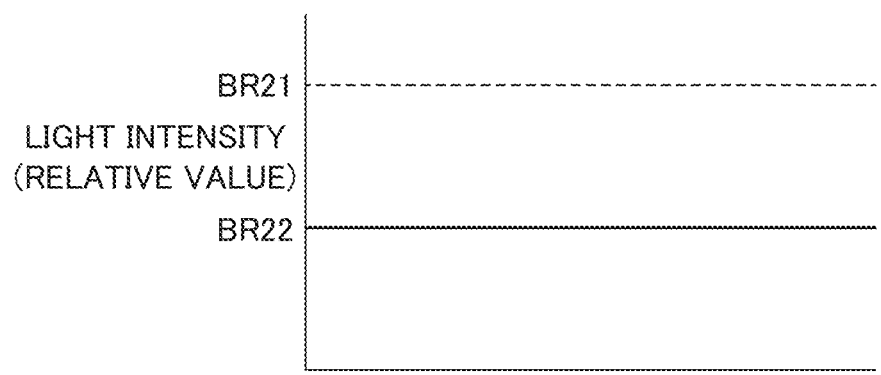
FIG. 22B is a diagram illustrating a distribution of a light intensity of s-polarized light in blue illumination light rays in A23-A23 illustrated in FIG. 22A.
Figure 23A:
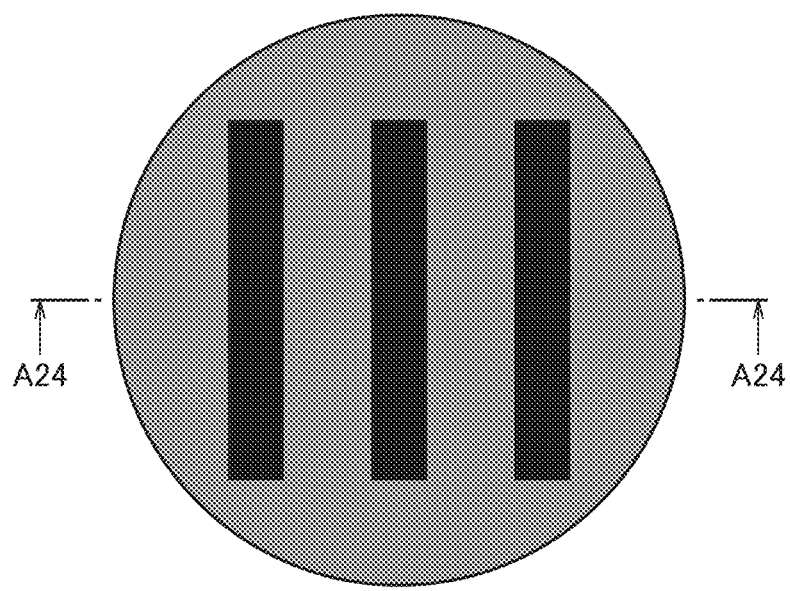
FIG. 23A is a diagram illustrating a brightness distribution of p-polarized light in blue illumination light rays.
Figure 23B:
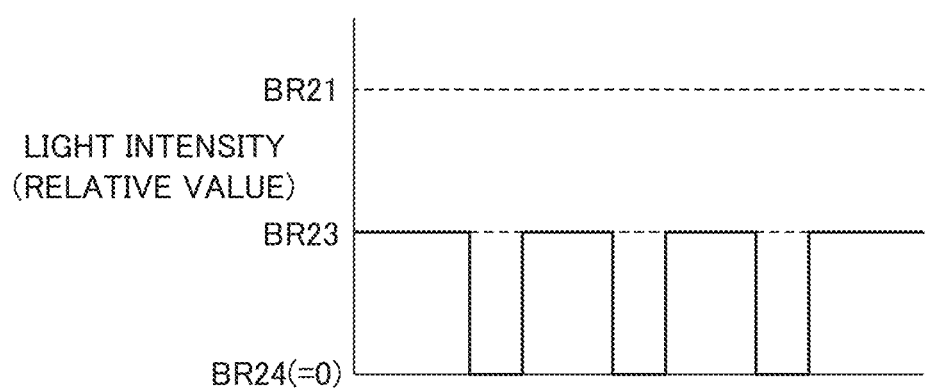
FIG. 23B is a diagram illustrating a distribution of a light intensity of p-polarized light in blue illumination light rays in A24-A24 illustrated FIG. 23A.

FIG. 21A corresponds to FIG. 20A and illustrates the distribution of the brightness of the blue illumination light rays in shades. FIG. 21B illustrates the distribution of the brightness of the blue illumination light rays in A22-A22 illustrated in FIG. 21A as the light intensity distribution. FIG. 22A corresponds to FIG. 21A and illustrates the distribution of the brightness of s-polarized light in the blue illumination light rays in shades. FIG. 22B illustrates the distribution of the brightness of the s-polarized light in the blue illumination light rays in A23-A23 illustrated in FIG. 22A as the light intensity distribution. FIG. 23A corresponds to FIG. 21A and illustrates the distribution of the brightness of the p-polarized light in the blue illumination light rays in shades. FIG. 23B illustrates the distribution of the brightness of the p-polarized light in the blue illumination light rays in A24-A24 illustrated in FIG. 23A as the light intensity.

The s-polarized light in the blue illumination light rays are reflected at the specific polarization reflection areas 220R and the total reflection areas 220T of the dichroic mirror 220. Therefore, at the position Pe, as illustrated in FIG. 22A, the s-polarized light in the blue illumination light rays are darker than the red illumination light rays and the green illumination light rays and the brightness (light intensity) distribution is uniform. That is, as illustrated in FIG. 22B, the s-polarized light in the blue illumination light rays have a light intensity BR22 (BR22<BR21) smaller than the light intensity BR21 of the red illumination light rays and the green illumination light rays at the position Pe.

The brightness (light intensity) distribution of s-polarized light in the blue illumination light rays illustrated in FIGS. 22A and 22B corresponds to the brightness (light intensity) distribution of p-polarized light in the blue illumination light rays illustrated in FIGS. 8A and 8B. The light intensity BR22 of the s-polarized light in the blue illumination light rays at the position Pe corresponds to the light intensity BR4 of the p-polarized light in the blue illumination light rays at the position Pa.

The p-polarized light in the blue illumination light rays pass through the specific polarization reflection areas 220R of the dichroic mirror 220 and are reflected at the total reflection areas 220T. Therefore, the p-polarized light in the blue illumination light rays are not irradiated onto the region corresponding to the specific polarization reflection areas 220R at the position Pe. Therefore, at the position Pe, as illustrated in FIG. 23A, the p-polarized light in the blue illumination light rays are not irradiated onto the region corresponding to the specific polarization reflection areas 220R, and the region corresponding to the total reflection areas 220T has a brightness (light intensity) distribution darker than the red illumination light rays and the green illumination light rays.

That is, as illustrated in FIG. 23B, in the p-polarized light in the blue illumination light rays, the region corresponding to the total reflection areas 220T has a light intensity BR23 (BR23<BR21) smaller than the light intensity BR21 of the red illumination light rays and the green illumination light rays, and the region corresponding to the specific polarization reflection areas 220R has a light intensity BR24 (BR23>BR24=0) smaller than the light intensity BR23 in the region corresponding to the total reflection areas 220T.

The brightness (light intensity) distribution of the p-polarized light in the blue illumination light rays illustrated in FIGS. 23A and 23B corresponds to the brightness (light intensity) distribution of the s-polarized light in the blue illumination light rays illustrated in FIGS. 7A and 7B. The light intensities BR23 and BR24 of the p-polarized light in the blue illumination light rays at the position Pe correspond to the light intensities BR2 and BR3 of the s-polarized light in the blue illumination light rays at the position Pa.

Therefore, as illustrated in FIG. 21A, the blue illumination light rays including the s-polarized light having the brightness (light intensity) distribution illustrated in FIGS. 22A and 22B and the p-polarized light having the brightness (light intensity) distribution illustrated in FIGS. 23A and 23B have the brightness (light intensity) distribution in which the region corresponding to the total reflection areas 220T has the same brightness as the red illumination light rays and the green illumination light rays, and the region corresponding to the specific polarization reflection areas 220R is darker than the red illumination light rays and the green illumination light rays.

That is, as illustrated in FIG. 21B, in the blue illumination light rays, the region corresponding to the total reflection areas 220T has the same light intensity BR25 (BR25=BR21) as the light intensity BR21 of the red illumination light rays and the green illumination light rays, and the region corresponding to the specific polarization reflection areas 220R has a light intensity BR26 (BR26<BR25) smaller than the light intensity BR25 in the region corresponding to the total reflection areas 220T. The difference between the light intensity BR25 and the light intensity BR26 of the blue illumination light rays at the position Pe is defined as a light intensity difference BRDe.

The brightness (light intensity) distribution of the blue illumination light rays illustrated in FIGS. 21A and 21B corresponds to the brightness (light intensity) distribution of the blue illumination light rays illustrated in FIGS. 6A and 6B. The light intensities BR25 and BR26 of the blue illumination light rays at the position Pe correspond to the light intensities BR5 and BR6 of the blue illumination light rays at the position Pa. The light intensity difference BRDe of the blue illumination light rays at the position Pe corresponds to the light intensity difference BRDa of the blue illumination light rays at the position Pa.

As illustrated in FIG. 18, the blue illumination light rays and the yellow illumination light rays which are reflected by the dichroic mirror 220 are further reflected by the reflection mirror 141. As for the blue illumination light rays and the yellow illumination light rays, the illumination distributions of the red illumination light rays, the green illumination light rays, and the blue illumination light rays irradiated onto the image display elements 108R, 108G, and 108B are made uniform by the lenses 132 and 133.

The phase difference plate 103 is arranged between the dichroic mirror 220 and the polarization conversion element 150 on the optical path of the blue illumination light rays and the yellow illumination light rays. FIG. 18 illustrates, as an example, a state in which the phase difference plate 103 is arranged between the lens 132 and the lens 133. The phase difference plate 103 is arranged in the direction of converting linearly polarized light into circularly polarized light. The phase difference plate 103 is a λ/4 phase difference plate, for example.

The distribution of the brightness of the blue illumination light rays, and the red illumination light rays and green illumination light rays included in the yellow illumination light rays at a position Pf where the blue illumination light rays and the yellow illumination light rays have passed through the phase difference plate 103 will be described with reference to FIGS. 9A, 9B, 10A, 10B, 11A, 11B, 12A, and 12B. FIGS. 9A, 9B, 10A, 10B, 11A, 11B, 12A, and 12B respectively correspond to FIGS. 20A, 20B, 21A, 21B, 22A, 22B, 23A, and 23B.

The position Pf illustrated in FIG. 18 corresponds to the position Pb illustrated in FIG. 3. The region corresponding to the specific polarization reflection areas 220R at the position Pf corresponds to the region corresponding to the specific polarization reflection areas 120R at the position Pb. The region corresponding to the total reflection areas 220T at the position Pf corresponds to the region corresponding to the transmission areas 120T at the position Pb.

At the position Pf, as illustrated in FIG. 9A, the brightness (light intensity) distribution of the red illumination light ray and the green illumination light ray is uniform. As illustrated in FIG. 9B, the light intensity of the red illumination light rays and the green illumination light rays at the position Pf is defined as BR27. The light intensity BR27 of the red illumination light rays and the green illumination light rays at the position Pf corresponds to the light intensity BR7 of the red illumination light rays and the green illumination light rays at the position Pb.

The phase difference plate 103 converts the blue illumination light rays that are linearly polarized light into circularly polarized light. As illustrated in FIGS. 11A and 12A, the phase difference plate 103 converts the blue illumination light rays into circularly polarized light, thereby making the s-polarized light and the p-polarized light in the blue illumination light rays have the same brightness (light intensity) distribution.

The s-polarized light and the p-polarized light in the blue illumination light rays have the brightness (light intensity) distribution in which the region corresponding to the total reflection areas 220T is darker than the red illumination light rays and the green illumination light rays, and the region corresponding to the specific polarization reflection areas 220R is even darker than the region corresponding to the total reflection areas 220T.

That is, as illustrated in FIG. 11B, in the s-polarized light in the blue illumination light rays, the region corresponding to the total reflection areas 220T has a light intensity BR28 (BR28<BR27) smaller than the light intensity BR27 of the red illumination light rays and the green illumination light rays, and the region corresponding to the specific polarization reflection areas 220R has a light intensity BR29 (BR29<BR28) smaller than the light intensity BR28 in the region corresponding to the total reflection areas 220T. The light intensities BR28 and BR29 of the s-polarized light in the blue illumination light rays at the position Pf correspond to the light intensities BR8 and BR9 of the s-polarized light in the blue illumination light rays at the position Pb.

As illustrated in FIG. 12B, in the p-polarized light in the blue illumination light rays, the region corresponding to the total reflection areas 220T has a light intensity BR30 (BR30<BR27) smaller than the light intensity BR27 of the red illumination light rays and the green illumination light rays, and the region corresponding to the specific polarization reflection areas 220R has a light intensity BR31 (BR31<BR30) smaller than the light intensity BR30 in the region corresponding to the total reflection areas 220T. The light intensities BR30 and BR31 of the p-polarized light in the blue illumination light rays at the position Pf correspond to the light intensities BR10 and BR11 of the p-polarized light in the blue illumination light rays at the position Pb.

Therefore, as illustrated in FIG. 10A, the blue illumination light rays including the s-polarized light having the brightness (light intensity) distribution illustrated in FIGS. 11A and 11B and the p-polarized light having the brightness (light intensity) distribution illustrated in FIGS. 12A and 12B have the brightness (light intensity) distribution in which the region corresponding to the total reflection areas 220T has the same brightness as the red illumination light rays and the green illumination light rays, and the region corresponding to the specific polarization reflection areas 220R is darker than the red illumination light rays and the green illumination light rays.

That is, as illustrated in FIG. 10B, in the blue illumination light rays, the region corresponding to the total reflection areas 220T has the same light intensity BR32 (BR32=BR27) as the light intensity BR27 of the red illumination light rays and the green illumination light rays, and the region corresponding to the specific polarization reflection areas 220R has a light intensity BR33 (BR33<BR32) smaller than the light intensity BR32 in the region corresponding to the total reflection areas 220T. The difference between the light intensity BR32 and the light intensity BR33 of the blue illumination light rays at the position Pf is defined as a light intensity difference BRDf.

The light intensities BR32 and BR33 of the blue illumination light rays at the position Pf correspond to the light intensities BR12 and BR13 of the blue illumination light rays at the position Pb. The light intensity difference BRDf of the blue illumination. Light rays at the position Pf corresponds to the light intensity difference BRDb of the blue illumination light rays at the position Pb.

At the position Pf, it is preferable that the light intensities BR28 and BR29 of the s-polarized light and the light intensities BR30 and BR31 of the p-polarized light in the blue illumination light rays have the same value. At the position Pe where the blue illumination light rays are reflected at the dichroic mirror 220 and the position Pf where the blue illumination light rays transmit the phase difference plate 103, the light intensity difference BRDe and the light intensity difference BRDf are almost the same values.

As illustrated in FIG. 18, the polarization conversion element 150 is arranged on the optical path of the blue illumination light rays and the yellow illumination light rays transmitted through the phase difference plate 103. The blue illumination light rays and the yellow illumination light rays transmitted through the phase difference plate 103 are incident onto the polarization conversion element 150 illustrated in FIGS. 18 and 13. The specific polarization reflection areas 220R of the dichroic mirror 220 and the phase difference plate 152 of the polarization conversion element 150 correspond to each other. In a second embodiment, the phase difference plate 152 is defined as a second phase difference plate.

The distribution of the brightness of the blue illumination light rays, and the red illumination light rays and the green illumination light rays included in the yellow illumination light rays at a position Pg where the blue illumination light rays and the yellow illumination light rays have passed through the polarization conversion element 150 will be described with reference to FIGS. 14A, 14B, 15A, 15B, 16A, 16B, 17A, and 17B. The position Pg corresponds to the position of the illumination pupil. FIGS. 14A, 14B, 15A, 15B, 16A, 16B, 17A, and 17B respectively correspond to FIGS. 9A, 9B, 10A, 10B, 11A, 11B, 12A, and 12B.

The position Pg illustrated in FIG. 18 corresponds to the position Pc illustrated in FIG. 3. The region corresponding to the specific polarization reflection areas 220R at the position Pg corresponds to the region corresponding to the specific polarization reflection areas 120R at the position Pc. The region corresponding to the total reflection areas 220T at the position Pg corresponds to the region corresponding to the transmission areas 120T at the position Pc.

The yellow illumination light rays are aligned to p-polarized light by the polarization conversion element 150. In the illumination pupil (position Pg), as illustrated in FIG. 14A, the brightness (light intensity) distribution of the red illumination light rays and the green illumination light rays is uniform. As illustrated in FIG. 14B, the light intensity of the red illumination light rays and the green illumination light rays in the illumination pupil is defined as BR34. The light intensity BR34 of the red illumination light rays and the green illumination light rays at the position Pg corresponds to the light intensity BR14 of the red illumination light rays and the green illumination light rays at the position Pc.

As illustrated in FIG. 13, the polarization conversion element 150 transmits the p-polarized light. As illustrated in FIG. 17A, the p-polarized light in the blue illumination light rays incident onto the polarization conversion element 150 have the brightness (light intensity) distribution in which the region corresponding to the total reflection areas 220T is darker than the red illumination light rays and the green illumination light rays, and the region corresponding to the specific polarization reflection areas 220R is darker than the region corresponding to the total reflection areas 220T, and the p-polarized light pass through the polarization conversion element 150.

That is, as illustrated in FIG. 17B, in the p-polarized light in the blue illumination light rays incident onto the polarization conversion element 150, the region corresponding to the total reflection areas 220T has a light intensity BR39 (BR39<BR34) smaller than the light intensity BR34 of the red illumination light rays and the green illumination light rays, and the region corresponding to the specific polarization reflection areas 220R has a light intensity BR40 (BR40<BR39) smaller than the light intensity BR39 in the region corresponding to the total reflection areas 220T, and the p-polarized light pass through the polarization conversion element 150. The light intensities BR39 and BR40 of the p-polarized light in the blue illumination light rays at the position Pg correspond to the light intensities BR19 and BR20 of the p-polarized light in the blue illumination light rays at the position Pc.

As illustrated in FIG. 13, the polarization conversion element 150 shifts the optical axis of the s-polarized light in the reflection direction by reflecting the s-polarized light incident onto the polarization conversion element 150 in the polarization beam splitter 151. The polarization conversion element 150 converts the s-polarized light into the p-polarized light by the phase difference plate 152. Therefore, the blue illumination light rays are aligned to the p-polarized light by the polarization conversion element 150.

As illustrated in FIGS. 16A and 16B, the s-polarized light in the blue illumination light rays incident onto the polarization conversion element 150 become p-polarized blue illumination light rays having the brightness (light intensity) distribution in which the distribution of brightness (light intensity) illustrated in FIGS. 11A and 11B is shifted in the reflection direction by the polarization conversion element 150, and the blue illumination light rays are emitted from the polarization conversion element 150.

The s-polarized light in the blue illumination light rays incident onto the polarization conversion element 150 become p-polarized blue illumination light rays having the brightness (light intensity) distribution in which the region corresponding to the total reflection areas 220T is darker than the red illumination light rays and the green illumination light rays, and the region corresponding to the specific polarization reflection areas 220R is darker than the region corresponding to the total reflection areas 220T, and the blue illumination light rays are emitted from the polarization conversion element 150.

That is, as illustrated in FIG. 16B, the s-polarized light in the blue illumination light rays incident onto the polarization conversion element 150 become p-polarized blue illumination light rays in which the region corresponding to the total reflection areas 220T has a light intensity BR37 (BR37<BR34) smaller than the light intensity BR34 of the red illumination light rays and the green illumination light rays, and the region corresponding to the specific polarization reflection areas 220R has a light intensity BR38 (BR38<BR37) smaller than the light intensity BR37 in the region corresponding to the total reflection areas 220T, and the blue illumination light rays are emitted from the polarization conversion element 150.

The light intensities BR37 and BR38 of the p-polarized light in the blue illumination light rays at the position Pg corresponding to the s-polarized light in the blue illumination light rays at the position Pf correspond to the light intensities BR17 and BR18 of the p-polarized light of the blue illumination light rays at the position Pc corresponding to the s-polarized light in the blue illumination light rays at the position Pb.

Therefore, as illustrated in FIG. 15A, the blue illumination light rays aligned to the p-polarized light by the polarization conversion element 150 have the brightness (light intensity) distribution in which the region corresponding to the total reflection areas 220T has the same brightness as the red illumination light rays and the green illumination light rays, and the region corresponding to the specific polarization reflection areas 220R is darker than the red illumination light rays and the green illumination light rays.

That is, as illustrated in FIG. 15B, in the blue illumination light rays emitted from the polarization conversion element 150, the region corresponding to the total reflection areas 220T has the same light intensity BR35 (BR35=BR34) as the light intensity BR34 of the red illumination light rays and the green illumination light rays, and the region corresponding to the specific polarization reflection areas 220R has a light intensity BR36 (BR36<BR35) smaller than the light intensity BR35 in the region corresponding to the total reflection areas 220T. The difference between the light intensity BR35 and the light intensity BR36 of the blue illumination light rays in the illumination pupil (position Pg) is defined as a light intensity difference BRDg.

The light intensities BR35 and BR36 of the blue illumination light rays at the position Pg correspond to the light intensities BR15 and BR16 of the blue illumination light rays at the position Pc. The light intensity difference BRDg or the blue illumination light rays at the position Pg corresponds to the light intensity difference BRDc of the blue illumination light rays at the position Pc.

In the projector 200 and the multi-projection system 1 using the projector 200, the blue illumination light rays emitted from the plurality of blue laser elements BL forming the light source 101 are converted from linearly polarized light to circularly polarized light by the phase difference plate 103, and then the polarization conversion element 150 transmits the p-polarized light in the blue illumination light rays and shifts the optical axis or the s-polarized light.

Therefore, according to the projector 200 and the multi-projection system 1, since the light intensity difference BRDg of the blue illumination light rays at the illumination pupil (position Pg) can be made smaller than the light intensity differences BRDe and BRDf of the blue illumination light rays at the positions Pe and Pf, it is possible to reduce the variation in the brightness of the blue illumination light rays.

As illustrated in FIG. 18, the blue illumination light rays and the yellow illumination light rays aligned to the polarizes light by the polarization conversion element 150 are irradiated onto the dichroic mirror 105 via the lens 134. The dichroic mirror 105 separates the incident blue illumination light rays and yellow illumination light rays.

The yellow illumination light rays YLL separated by the dichroic mirror 105 are reflected at the reflection mirror 142 and irradiated onto the dichroic mirror 106. The dichroic mirror 106 separates the yellow illumination light rays YLL into red illumination light rays RLL containing red band components and green illumination light rays GLL containing green band components.

The red illumination light rays RLL separated by the dichroic mirror 106 are irradiated onto the reflective polarizing plate 107R via the lens 135. The green illumination light rays GLL separated by the dichroic mirror 106 are irradiated onto the reflective polarizing plate 107G via the lens 136. The blue illumination light rays BLL separated by the dichroic mirror 105 are reflected by the reflection mirror 143 and irradiated onto the reflective polarizing plate 107B via the lens 137.

The reflective polarizing plates 107R, 107G, and 107B reflect either s-polarized light or p-polarized light and transmit the other. FIG. 18 illustrates a state in which the reflective polarizing plates 107R, 107G, and 107B reflect s-polarized light and transmit p-polarized light. The red illumination light rays RLL, the green illumination light rays GLL, and the blue illumination light rays BLL, which are p-polarized light, respectively transmit the reflective polarizing plates 107R, 107G, and 107B, and are respectively irradiated onto the image display elements 108R, 108G, and 108B.

The image display element 108R photomodulates the red illumination light rays RLL based on the image data of the red components to generate an s-polarized red image light rays RML. The image display element 108G photomodulates the green illumination light rays GLL based on the image data of the green components to generate s-polarized green image light rays GML. The image display element 108B photomodulates the blue illumination light rays BLL based on the image data of the blue components to generate s-polarized blue image light rays BML.

The red image light rays RML, the green image light rays GML, and the blue image light rays BML generated by the image display elements 108R, 108G, and 108B are respectively reflected by the reflective polarizing plates 107R, 107G, and 107B, and are irradiated onto the color combining prism 109. The color combining prism 109 reflects the red image light rays RML and the blue image light BML and transmits the green image light GML to combine the red image light rays RML, the green image light rays GML, and the blue image light rays BML.

As illustrated in FIG. 1 or 18, the red image light rays RML, the green image light rays GML, and the blue image light rays BML synthesized by the color combining prism 109 are projected onto the screen SRN or the like via the aperture 110 and the projection lens 111. As a result, the projector 200 displays the full-color image IM in which the red image light rays RML, the green image light rays GML, and the blue image light rays BML are combined on the screen SRN or the like.

As illustrated in FIG. 18, a position Ph of the aperture 110 corresponds to the position of the projection pupil. The position Ph illustrated in FIG. 18 corresponds to the position Pd illustrated in FIG. 3. The illumination pupil and the projection pupil have a conjugate relationship. Therefore, the brightness distribution of the red image light rays RML, the green image light rays GML, and the blue image light rays BML at the position Ph corresponding to the position of the projection pupil corresponds to the brightness distribution of the red illumination light rays RLL, the green illumination light rays GLL, and the blue illumination light rays BLL at the position Pg corresponding to the position of the illumination pupil.

A comparative example is a state in which the phase difference plate 103 is not arranged. In the comparative example, the brightness distribution of the red image light rays RML, the green image light rays GML, and the blue image light rays BML at the position Ph corresponding to the position of the projection pupil corresponds to the brightness distribution of the red illumination light rays RLL, the green illumination light rays GLL, and the blue illumination light rays BLL at the position Pe.

Therefore, according to the projector 200 and the multi-projection system 1, by converting the blue illumination light rays BLL into circularly polarized light by the phase difference plate 103, and further shifting the optical axis of the s-polarized light of the blue illumination light rays by the polarization conversion element 150, it is possible to reduce the variation in the brightness of the blue image light rays BLL in the projection pupil as compared with the comparative example.

Consequently, according to the projector 200 and the multi-projection system 1, the color distribution caused by the light shielding plate 10 can be reduced by reducing the variation in the brightness of the blue image light rays BLL in the projection pupil. According to the projector 200 and the multi-projection system 1, when the projector 200 includes the blue laser element BL and the phosphor 102 which are a plurality of illumination light sources, deterioration of the quality of the multi-projection image can be suppressed.

The invention is not limited to the above-described one or more embodiments and various modifications can be made without departing from the scope of the invention.

Figure 24:
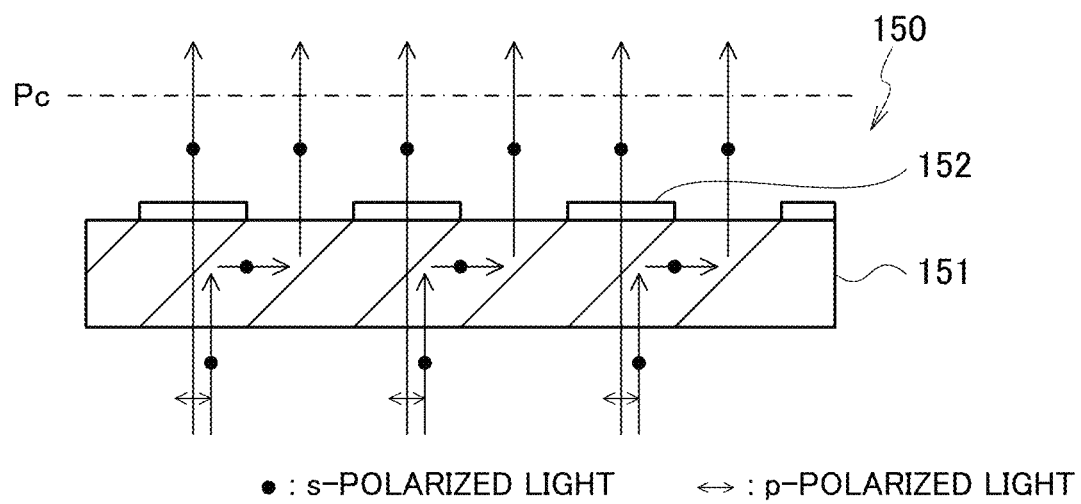
FIG. 24 is a configuration diagram illustrating an example of a polarization conversion element.

In the projectors 100 and 200 according to first and second embodiments, as illustrated in FIG. 13, the polarization conversion element 150 has a phase difference plate 152 arranged on the optical path of the s-polarized light. As illustrated in FIG. 24, in the polarization conversion element 150, the phase difference plate 152 may be arranged on the optical path of the p-polarized light instead of the s-polarized light.

In this case, the polarization conversion element 150 shifts the optical axis of the s-polarized light in the reflection direction by reflecting the s-polarized light incident on the polarization conversion element 150 in the polarization beam splitter 151. The polarization conversion element 150 converts the p-polarized light into the s-polarized light by the phase difference plate 152. Therefore, the blue illumination light rays and the yellow illumination light rays emitted from the polarization conversion element 150 are aligned to the s-polarized light by the polarization conversion element 150.

In the projectors 100 and 200 according to first and second embodiments, as illustrated in FIGS. 3 and 18, the dichroic mirrors 120 and 220 are arranged so that the longitudinal directions the specific polarization reflection areas 120R and 220R, the transmission areas 120T and the total reflection areas 220T are set in a front-back direction of the paper surface. In the polarization conversion element 150, as illustrated in FIG. 13, the polarization beam splitter 151 is arranged so that the optical axis of the s-polarized light is shifted to a left-right direction of the paper surface and a longitudinal direction of the phase difference plate 152 is set in the front-back direction of the paper surface, corresponding to the dichroic mirrors 120 and 220.

The dichroic mirrors 120 and 220 may be arranged so that the longitudinal directions of the specific polarization reflection areas 120R and 220R, and the transmission areas 120T and the total reflection area 220T are set in an up-down direction of the paper surface. Specifically, the dichroic mirrors 120 may be arranged so as to be rotated 90 degrees clockwise or counterclockwise with respect to the state illustrated in FIG. 4A. The dichroic mirror 220 may be arranged so as to be rotated 90 degrees clockwise or counterclockwise with respect to the state illustrated in FIG. 19A.

The polarization conversion element 150 is arranged so that the polarization beam splitter 151 shifts the optical axis of the s-polarized light toward the front-back direction of the paper surface, and the longitudinal direction of the phase difference plate 152 is set in the left-right direction of the paper surface in correspondence with the dichroic mirrors 120 and 220.

Figure 25:
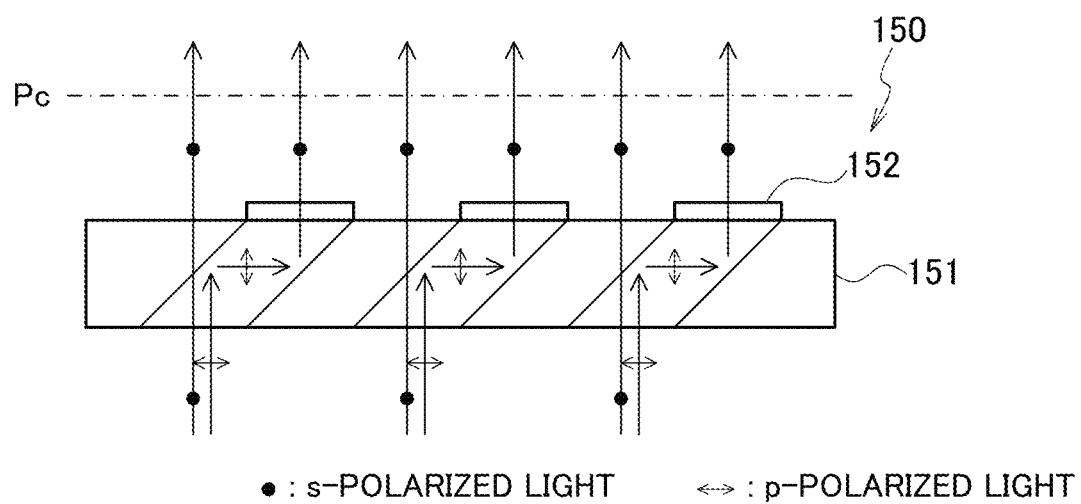
FIG. 25 is a configuration diagram illustrating another example of a polarization conversion element.

In this case, as illustrated in FIG. 25, the polarization conversion element 150 shifts the optical axis of the p-polarized light in the reflection direction by reflecting the p-polarized light incident on the polarization conversion element 150 in the polarization beam splitter 151. Further, the polarization conversion element 150 converts the p-polarized light into the s-polarized light by the phase difference plate 152. The polarization conversion element 150 transmits the s-polarized light incident on the polarization conversion element 150.

Therefore, the blue illumination light rays and the yellow illumination light rays emitted from the polarization conversion element 150 are aligned to the s-polarized light by the polarization conversion element 150. Note that each component portion after the polarization conversion element 150 has the opposite characteristics for s-polarized light and p-polarized light with respect to the case where the blue illumination light rays and the yellow illumination light rays are aligned to the p-polarized light by the polarization conversion element 150.

Furthermore, a configuration in which FIGS. 24 and 25 are combined, that is, a configuration where, in the polarization conversion element 150, the polarization beam splitter 151 shifts the optical axis of the s-polarized light toward the front-back direction of the paper surface with respect to the state illustrated in FIG. 13, the phase difference plate 152 is arranged so that the longitudinal direction is set in the left-right direction of the paper surface, and further the phase difference plate 152 is arranged on the optical path of the p-polarized light instead of the s-polarized light may be used.

The dichroic mirrors 120 and 220 are arranged so that the longitudinal directions of the specific polarization reflection areas 120R and 220R, the transmission areas 120T and the total reflection area (areas) 220T are in the up-down direction of the paper surface with respect to the states illustrated in FIGS. 3 and 18.

In this case, the polarization conversion element 150 shifts the optical axis of the p-polarized light in the reflection direction by reflecting the p-polarized light incident on the polarization conversion element 150 in the polarization beam splitter 151. The polarization conversion element 150 converts the s-polarized light incident on the polarization conversion element 150 into the p-polarized light by the phase difference plate 152. Therefore, the blue illumination light rays and the yellow illumination light rays emitted from the polarization conversion element 150 are aligned to the p-polarized light by the polarization conversion element 150.

In the projector 100 according to a first embodiment, the light source 101 (blue laser element BL) is configured to emit s-polarized blue laser light rays, but it may be configured to emit p-polarized blue laser light rays. In this case, the characteristics of each component portion with respect to s-polarized light and p-polarized light are reversed.

For example, the dichroic mirror 120 is arranged so that the polarization direction of the blue laser light rays is p-polarized with respect to the dichroic mirror 120 and has optical characteristics of reflecting the p-polarized light and transmitting the s-polarized light with respect to the blue laser light rays. In this case, the p-polarized light is set as a first linearly polarized light and the s-polarized light is set as a second linearly polarized light.

In the projector 200 according to a second embodiment, the light source 101 (blue laser element BL) is configured to emit p-polarized blue laser light rays, but it may be configured to emit s-polarized blue laser light rays. In this case, the characteristics of each component portion with respect to p-polarized light and s-polarized light are reversed.

For example, the dichroic mirror 220 is arranged so that the polarization direction of the blue laser light rays is p-polarized with respect to the dichroic mirror 220 and has optical characteristics of reflecting the p-polarized light and transmitting the s-polarized light with respect to the blue laser light rays. In this case, the p-polarized light is set as a first linearly polarized light and the s-polarized light is set as a second linearly polarized light.

What is claimed is:
1. A projector comprising:
a first illumination light source provided as a blue laser light source configured to emit a blue laser light ray as a first illumination light ray provided as an s-polarized linearly polarized light;
a second illumination light source provided as a phosphor comprising a fluorescent layer and a reflective surface, the fluorescent layer configured to emit a yellow illumination light ray as a second illumination light ray containing a red band component and a green band component, the yellow illumination light ray generated by irradiating the fluorescent layer with the first illumination light ray, and the reflective surface configured to reflect the first illumination light ray transmitted through the fluorescent layer and the yellow illumination light ray generated by the fluorescent layer, the first illumination light ray reflected by the reflective surface being a blue laser light ray containing an s-polarized light and a p-polarized light;

a first dichroic mirror, which is arranged on an optical path of the first and second illumination light rays, comprising a specific polarization reflection area and a transmission area, the specific polarization reflection area arranged on an optical axis of the first the reflective surface and to transmit the p-polarized light and the second illumination light ray reflected by the reflective surface, and the transmission area being an area different from the specific polarization reflection area, and configured to transmit the s-polarized light, the p-polarized light, and the second illumination light ray reflected by the reflective surface;

a first phase difference plate, which is arranged on an optical path of the first and second illumination light rays which pass through the first dichroic mirror, configured to convert the linearly polarized light into circularly polarized light; and a polarization conversion element, which is arranged on an optical path of the first and second illumination light rays transmitted through the first phase difference plate, comprising a polarization beam splitter configured to transmit a polarized light of either the s-polarized light or the p-polarized light, and to shift an optical axis of the other polarized light, and a second phase difference plate configured to align the first and second illumination light rays to the s-polarized light or the p-polarized light.

2. The projector according to claim 1, wherein
the phosphor diffuses the first illumination light ray into a randomly polarized blue laser light ray in which a plurality of polarized light transmissions containing the s-polarized light and the p-polarized light are mixed and irradiates the first dichroic mirror with the yellow illumination light ray and the randomly polarized blue laser light ray.

3. The projector according to claim 1, further comprising:
a second dichroic mirror, which is arranged on optical paths of the first and second illumination light rays transmitted through the polarization conversion element, configured to separate the yellow illumination light ray the blue laser light ray, and
a third dichroic mirror, which is arranged on an optical path of the yellow illumination light ray separated by the second dichroic mirror, configured to separate the yellow illumination light ray into a red illumination light ray containing a component in the red band and a green illumination light ray containing a component in the green band.

4. A projector comprising:
a first illumination light source provided as a blue laser light source configured to emit a blue laser light ray as a first illumination light ray provided as a p-polarized light;
a second illumination light source provided as a phosphor comprising a fluorescent layer and a reflective surface, the fluorescent layer configured to emit a yellow illumination light ray as a second illumination light ray containing a red band component and a green band component, the yellow illumination light ray generated by irradiating the fluorescent layer with the first illumination light ray, and the reflective surface configured to reflect the first illumination light ray transmitted through the fluorescent layer and the yellow illumination light ray generated by the fluorescent layer, the first illumination light ray reflected b the reflective surface being a blue laser light ray containing an s-polarized light and a p-polarized light;

a first dichroic mirror, which is arranged on an optical path of the first and second illumination light rays, comprising a specific polarization reflection area and a total reflection area, the specific polarization reflection area arranged on an optical axis of the first illumination light source, and configured to transmit the p-polarized light provided as reflected by the reflective surface and to reflect the s-polarized light and the second illumination light ray reflected by the reflective surface, and the total reflection area being an area different from the specific polarization reflection area, and configured to reflect the s-polarized light, the p-polarized light, and the second illumination light ray reflected by the reflective surface;

a first phase difference plate, which is arranged on an optical path of the first and second illumination light rays which are reflected by the first dichroic mirror, configured to convert the linearly polarized light into circularly polarized light; and a polarization conversion element, which is arranged on an optical path of the first and second illumination light rays transmitted through the first phase difference plate, comprising a polarization beam splitter configured to transmit a polarized light of either the s-polarized light or the p-polarized light, and to shift an optical axis of the other polarized light, and to align the first and second illumination light rays to the s-polarized light or the p-polarized light.

5. The projector according to claim 4, wherein
the phosphor diffuses the first illumination light ray into a randomly polarized blue laser light in which a plurality of polarized light transmissions containing the s-polarized light and the p-polarized light are mixed and irradiates the first dichroic mirror with the yellow illumination light ray and the randomly polarized blue laser light ray.

6. The projector according to claim 4, further comprising:
a second dichroic mirror, which is arranged on optical paths of the first and second illumination light rays transmitted through the polarization conversion element, configured to separate the yellow illumination light ray and the blue laser light ray, and
a third dichroic mirror, which is arranged on an optical path of the yellow illumination light ray separated by the second dichroic mirror, configured to separate the yellow illumination light ray into a red illumination light ray containing a component in the red band and a green illumination light ray containing a component in the green band.

7. A multi-projection system comprising:
a plurality of projectors, each of the projectors provided as a projector according to claim 1, which project images; and
a plurality of light shielding plates which are arranged corresponding to each of the projectors so as to block parts of the images, wherein
a plurality of images projected by the plurality of projectors are displayed as a multi-projection image by overlapping the parts each other.

8. A multi-projection system comprising:
a plurality of projectors, each of the projectors provided as a projector according to claim 4, which project images; and
a plurality of light shielding plates which are arranged corresponding to each of the projectors so as to block parts of the images, wherein a plurality of images projected by the plurality of projectors are displayed as a multi-projection image by overlapping the parts each other.

\* \* \* \* \*

UNITED STATES PATENT AND TRADEMARK OFFICE
CERTIFICATE OF CORRECTION

PATENT NO. : 11,372,321 B2
APPLICATION NO. : 16/951336
DATED : June 28, 2022
INVENTOR(S) : Takatsugu Aizaki, Shinji Kikuma and Yasuki Arihara It is certified that error appears in the above-identified patent and that said Letters Patent is hereby corrected as shown below:

In the Claims

Claim 1, Column 29, Line 5, please insert the phrase --illumination light source and configured to reflect the s-polarized light provided as reflected by-- between the phrases "an optical axis of the first" and "the reflective surface and to".

Signed and Sealed this
Twenty-third Day of August, 2022

Katherine Kelly Vidal
*Director of the United States Patent and Trademark Office*